(12) United States Patent
Hamagishi et al.

(10) Patent No.: US 9,930,322 B2
(45) Date of Patent: Mar. 27, 2018

(54) THREE-DIMENSIONAL IMAGE DISPLAY DEVICE

(71) Applicant: SAMSUNG DISPLAY CO., LTD., Yongin, Gyeonggi-Do (KR)

(72) Inventors: Goro Hamagishi, Hwaseong-si (KR); Se Huhn Hur, Yongin-si (KR); Il-Joo Kim, Hwaseong-si (KR); Seung Jun Jeong, Hwaseong-si (KR)

(73) Assignee: SAMSUNG DISPLAY CO., LTD., Yongin, Gyeonggi-Do (KR)

( * ) Notice: Subject to any disclaimer, the term of this patent is extended or adjusted under 35 U.S.C. 154(b) by 405 days.

(21) Appl. No.: 14/819,301

(22) Filed: Aug. 5, 2015

(65) Prior Publication Data
US 2016/0073097 A1 Mar. 10, 2016

(30) Foreign Application Priority Data

Sep. 4, 2014 (KR) .................. 10-2014-0117855

(51) Int. Cl.
*H04N 13/04* (2006.01)

(52) U.S. Cl.
CPC ..... *H04N 13/0404* (2013.01); *H04N 13/0415* (2013.01); *H04N 13/0447* (2013.01); *H04N 13/0484* (2013.01)

(58) Field of Classification Search
CPC ........... H04N 13/0404; H04N 13/0415; H04N 13/0447
See application file for complete search history.

(56) References Cited

U.S. PATENT DOCUMENTS

| 6,191,808 B1 * | 2/2001 | Katayama ............. G06T 15/205 348/36 |
| 2013/0128162 A1 | 5/2013 | Sakamoto et al. |
| 2013/0265640 A1 | 10/2013 | Saito |
| 2014/0002897 A1 | 1/2014 | Krijn et al. |

FOREIGN PATENT DOCUMENTS

JP  2001-166259  6/2001

* cited by examiner

*Primary Examiner* — Zhubing Ren
(74) *Attorney, Agent, or Firm* — F. Chau & Associates, LLC

(57) ABSTRACT

A stereoscopic image display device includes a viewpoint division unit that divides an image displayed in a plurality of pixels into images that correspond to k viewpoints, wherein the viewpoint division unit comprises a plurality of viewpoint division units inclined with an inclination angle that satisfies $$VA = \tan^{-1} \frac{b \times Hp}{m \times Vp},$$

where Hp denotes a pitch of a row direction of the pixels, Vp denotes a pitch of a column direction of the pixels, and m and b are natural numbers, and a number of first pixels arranged in an area defined by a unit of m×b among a plurality of first pixels emitting light transmitting the same viewpoint division unit among the plurality of viewpoint division units is n=b+m−1.

9 Claims, 29 Drawing Sheets

THREE-DIMENSIONAL IMAGE DISPLAY DEVICE

CROSS-REFERENCE TO RELATED APPLICATION

This application claims priority from Korean Patent Application No. 10-2014-0117855 filed in the Korean Intellectual Property Office on Sep. 4, 2014, and all the benefits accruing therefrom, the contents of which are herein incorporated by reference in their entirety.

BACKGROUND

(a) Technical Field

Embodiments of the present disclosure are directed to a stereoscopic image display device, and more particularly, to an auto-stereoscopic image display device.

(b) Discussion of the Related Art

With the development of display device technology, stereoscopic image display devices which can display a three-dimensional (3D) image has drawn attention, and various methods of displaying a 3D image have been studied. In general, a 3D image display technology than display objects in 3D uses binocular parallax, which is an important factor for perceiving a three-dimensional effect at short distances. That is, different 2D images are projected to the left eye and the right eye, and when the image projected to the left eye, hereafter referred to as "left-eye image", and the image projected to the right eye, hereafter referred to as "right-eye image", are transmitted to the brain, the left-eye image and the right-eye image are converged in the brain so that a three-dimensional image having depth may be perceived. A 3D image display device capable of displaying a 3D image uses binocular parallax, and may include a 3D image display device that uses glasses such as shutter glasses and polarized glasses, or an auto-stereoscopic 3D image display device uses an optical system such as a lenticular lens or a parallax barrier in the display device, rather than glasses. An auto-stereoscopic 3D display device can display a 3D image by separating the 3D image into multiple viewpoints using lenticular lenses or a parallax barrier with a plurality of openings.

SUMMARY

Embodiments of the present disclosure can provide a stereoscopic image display device that optimizes resolution of a 3D image viewed at each viewpoint in an auto-stereoscopic 3D image display device. In addition, exemplary embodiments of the present disclosure can provide an auto-stereoscopic image display device that can prevent an occurrence of cross-talk.

A stereoscopic image display device according to an embodiment includes: a viewpoint division unit that divides an image displayed in a plurality of pixels into images corresponding to k viewpoints, wherein the viewpoint division unit comprises a plurality of viewpoint division units inclined with an inclination angle with respect to a pixel column that satisfies:

$$VA = \tan^{-1}\frac{b \times Hp}{m \times Vp}$$

where Hp denotes a pitch of a row direction of the pixels, Vp denotes a pitch of a column direction of the pixels, and m and b are natural numbers, and a number of first pixels arranged in an m×b unit area that transmits a same viewpoint division unit is n=b+m−1.

The viewpoint division unit may include a lenticular lens.

A width of a row direction of the first pixel area viewed through the lenticular lens may be Hp/m.

A pitch of the lenticular lens may correspond to 2n/m pixels.

The stereoscopic image display device may further include a display panel that includes the plurality of pixels arranged in a matrix format. When a viewer views an image of the display panel at an optimal viewing distance from the viewpoint division unit, the following equation is satisfied:

$$\left(\frac{n}{m} \times Hp\right):g = E:d,$$
$$d:Lp = (d+g):\left(2 \times \frac{n}{m} \times Hp\right)$$

where E denotes a distance between both eyes of the viewer, g denotes a distance between the viewpoint division unit and the display panel, Lp denotes a pitch of the lenticular lens, and d denotes the optimal viewing distance.

The stereoscopic image display device may further include: a sensor for detecting locations of both viewer's eyes; and a controller for changing pixels when an image corresponding to the k viewpoints corresponds to the locations of both eyes.

The controller may change pixels of the image corresponding to the k viewpoints by setting a viewing area having a width of E/n as a control unit at the optimal viewing distance.

When the sensor detects the locations of both viewer's eyes to change to a second location from a first location while the k viewpoints display a binocular image, and a distance between the first location and the second location exceeds E/n, the controller may change at least one pixel of pixels displaying a left-eye image to display a right-eye image and changes at least one pixel of pixels displaying the right-eye image to display the left-eye image.

In an exemplary embodiment, b=3 and m=4.

Pixels in one pixel column may represent a same primary color.

Pixels of adjacent pixel columns may represent different primary colors.

A stereoscopic image display device according to another exemplary embodiment includes: a display panel that includes a plurality of pixels arranged in a matrix format; and a viewpoint division unit that divides an image displayed by the plurality of pixels into images corresponding to k viewpoints. The viewpoint division unit comprises a plurality of viewpoint division units comprising a lenticular lens inclined with an inclination angle. When a viewer views an image of the display panel at an optimal viewing distance from the viewpoint division unit, the following equation is satisfied:

$$\left(\frac{n}{m} \times Hp\right):g = E:d,$$
$$d:Lp = (d+g):\left(2 \times \frac{n}{m} \times Hp\right)$$

wherein E denotes a distance between both eyes of the viewer, g denotes a distance between the viewpoint division unit and the display panel, Lp denotes a pitch of the lenticular lens, d denotes the optimal viewing distance, Hp denotes a pitch of a row direction of the pixels, and m and b are natural numbers.

The inclination angle may satisfy $$VA = \tan^{-1} \frac{b \times Hp}{m \times Vp},$$

wherein Vp denotes a pitch of a column direction of the pixels. A number of first pixels arranged in an m×b unit area that transmits a same viewpoint division unit may be n=b+m−1, a width of a row direction of the first pixel area viewed through the lenticular lens may be Hp/m, and a pitch of the lenticular lens may correspond to 2n/m pixels.

The stereoscopic image display device may further comprise a sensor configured to detect locations of a viewer's eyes; and a controller configured to change pixels when an image corresponding to the k viewpoints corresponds to locations of both eyes.

When the sensor detects the locations of both viewer's eyes to change to a second location from a first location while the k viewpoints display a binocular image, and a distance between the first location and the second location exceeds E/n, the controller changes at least one pixel of pixels displaying a left-eye image to display a right-eye image and changes at least one pixel of pixels displaying the right-eye image to display the left-eye image.

A stereoscopic image display device according to another exemplary embodiment includes: a viewpoint division unit that divides an image displayed by a plurality of pixels into images corresponding to k viewpoints, wherein the viewpoint division unit comprises a plurality of viewpoint division units inclined with an inclination angle; a sensor configured to detect locations of a viewer's eyes; and a controller configured to change pixels when an image corresponding to the k viewpoints corresponds to locations of both eyes. When the sensor detects the locations of both viewer's eyes to change to a second location from a first location while the k viewpoints display a binocular image, wherein a distance between the first location and the second location exceeds a predetermined distance, the controller changes at least one pixel of pixels displaying a left-eye image to display a right-eye image and changes at least one pixel of pixels displaying the right-eye image to display the left-eye image.

The viewpoint division unit may comprise a lenticular lens, and the inclination angle may satisfy $$VA = \tan^{-1} \frac{b \times Hp}{m \times Vp},$$

wherein Vp denotes a pitch of a column direction of the pixels. A number of first pixels arranged in an m×b unit area that transmits a same viewpoint division unit may be n=b+m−1, a width of a row direction of the first pixel area viewed through the lenticular lens may be Hp/m, and a pitch of the lenticular lens may correspond to 2n/m pixels.

The stereoscopic image display device may further include a display panel that includes the plurality of pixels arranged in a matrix format. When a viewer views an image of the display panel at an optimal viewing distance from the viewpoint division unit, the following equation may be satisfied:

$$\left(\frac{n}{m} \times Hp\right) : g = E : d,$$

$$d : Lp = (d+g) : \left(2 \times \frac{n}{m} \times Hp\right)$$

wherein E denotes a distance between both eyes of the viewer, g denotes a distance between the viewpoint division unit and the display panel, Lp denotes a pitch of the lenticular lens, and d denotes the optimal viewing distance. The predetermined distance may be E/n.

According to at least one exemplary embodiment, resolution of a 3D image displayed in an auto-stereoscopic 3D image display device can be optimized. In addition, according to at least one exemplary embodiment, an occurrence of crosstalk in an auto-stereoscopic 3D image display device can be suppressed. However, various alternations and modifications within the spirit and the scope of embodiments of the present disclosure can be clearly understood by a person skilled in the art, and therefore it should be understood that a detailed description and specific exemplary embodiments the present disclosure are exemplarily provided.

DETAILED DESCRIPTION OF EXEMPLARY EMBODIMENTS

Figure 1:
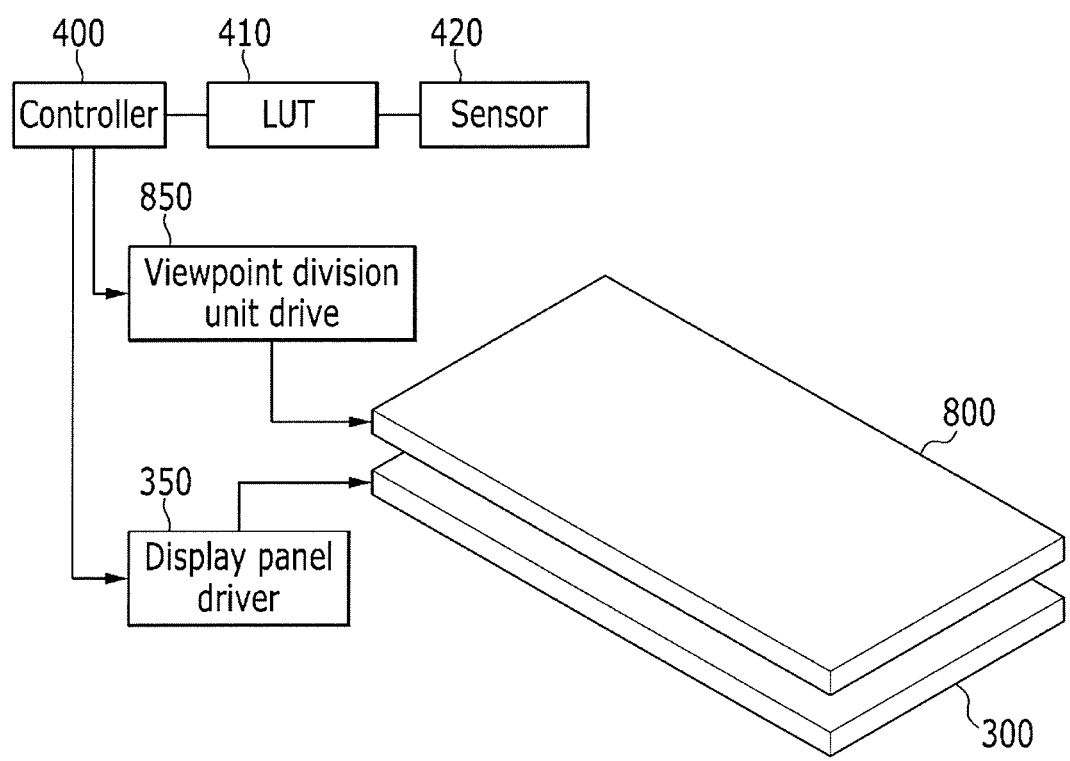
FIG. 1 is a schematic perspective view of a stereoscopic image display according to an exemplary embodiment.

Hereinafter, exemplary embodiments disclosed in the present specification will be described in detail with the accompanying drawings, in which like reference numerals may designate like elements throughout the specification, and the drawings and description are to be regarded as illustrative in nature and not restrictive. While the present disclosure may be embodied in many different forms, specific embodiments are shown in drawings and are described herein in detail, with the understanding that the present disclosure is to be considered as an exemplification of the principles of the disclosure and is not intended to limit the disclosure to the specific embodiments illustrated. When it is described that an element is "connected" to another element, the element may be "directly connected" to the other element or "electrically connected" to the other element through a third element.

Hereinafter, non-limiting exemplary embodiments of a stereoscopic image display device will be described with reference to the accompanying drawings.

Figure 2:
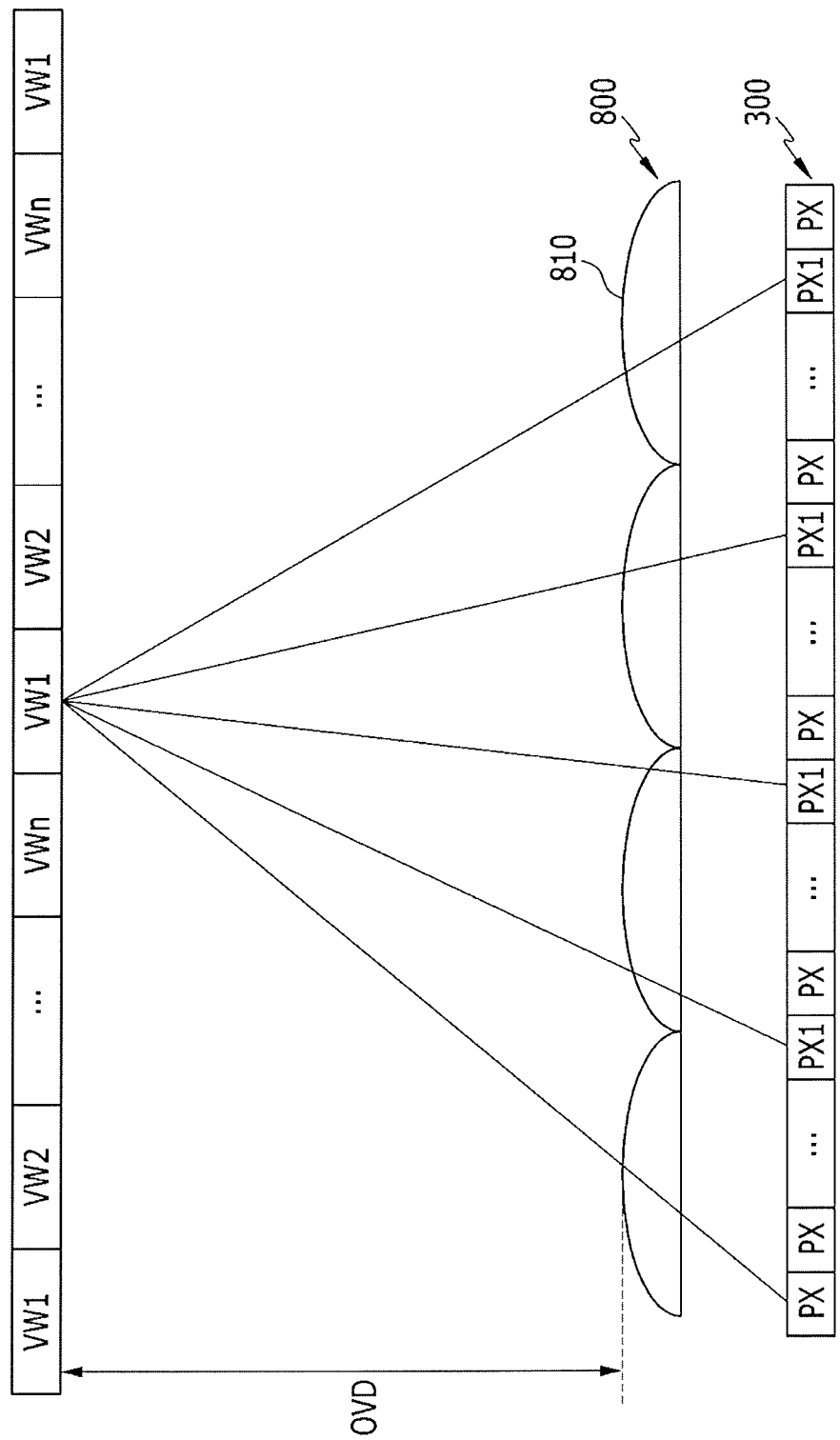
FIG. 2 illustrates pixels that emit light through viewpoints of an stereoscopic image display according to an exemplary embodiment.
Figure 3:
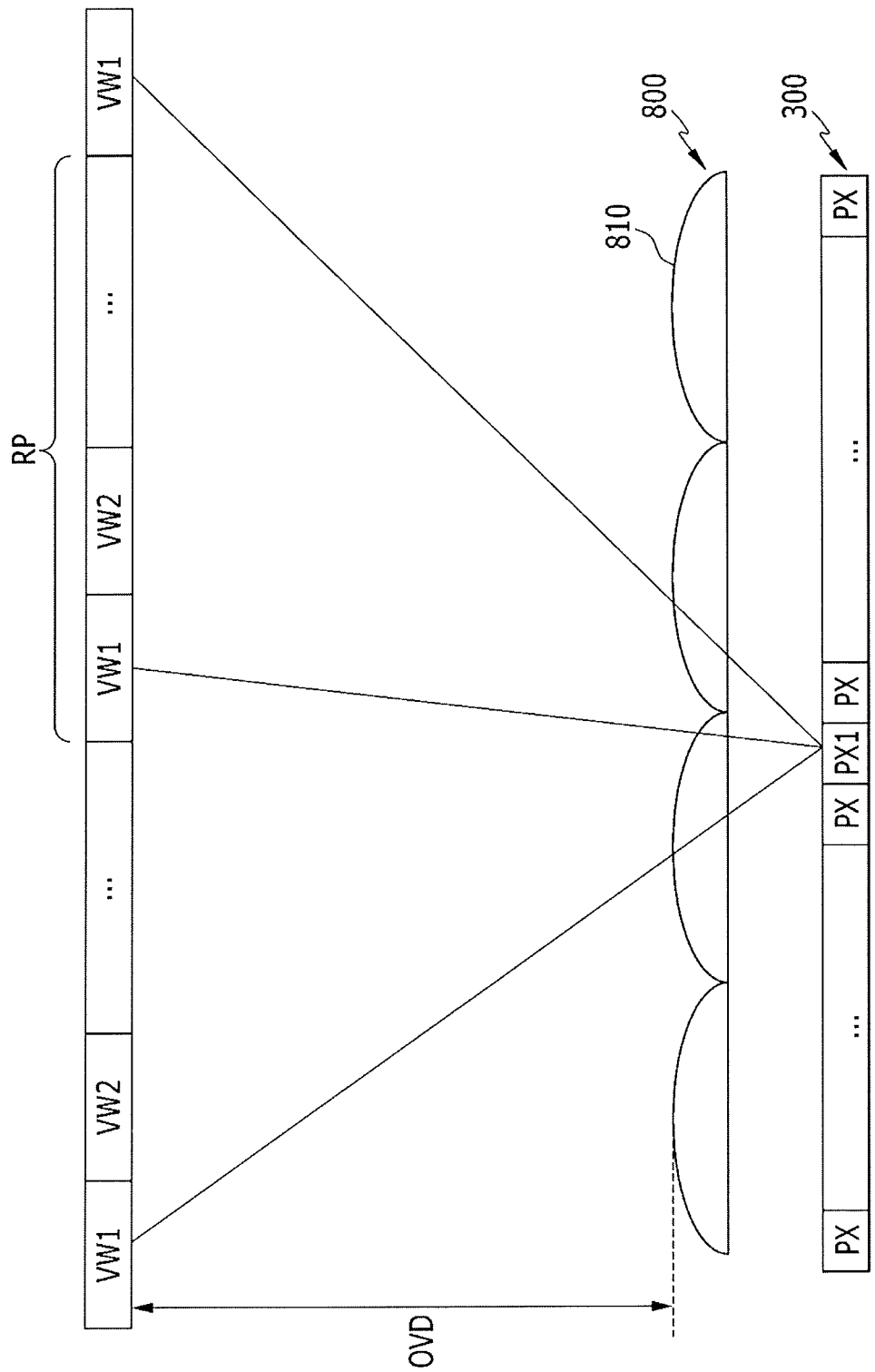
FIG. 3 illustrates viewpoints through which light emitted from the pixels of a stereoscopic image display device according to an exemplary embodiment passes.

FIG. 1 is a schematic perspective view of a stereoscopic image display device according to an exemplary embodiment, FIG. 2 illustrates a pixel that emits light through viewpoints of a stereoscopic image display device according to an exemplary embodiment, and FIG. 3 illustrates viewpoints through which light emitted from the pixels of a stereoscopic image display device according to an exemplary embodiment passes.

Referring to FIG. 1 to FIG. 3, a stereoscopic image display device according to an exemplary embodiment includes a display panel 300, a display panel driver 350, a viewpoint division unit 800, a viewpoint division unit driver 850, a controller 400, a lookup table (LUT) 410, and a sensor 420. The display panel 300 displays an image, and may be one of various display devices, such as a plasma display panel (PDP), a liquid crystal display (LCD), an organic light emitting display, etc.

The display panel 300 includes a plurality of signal lines and a plurality of pixels connected to the signal lines. The plurality of pixels PX may be arranged substantially in a matrix format. Each pixel PX may include a switching element such as a thin film transistor connected to a signal line, and a pixel electrode connected to the switching element. The signal lines may include a plurality of gate lines that transmit a gate signal, also referred to as a scan signal, that correspond to a pixel, and a plurality of data lines that transmit a data signal corresponding to the pixel. Each pixel PX may uniquely display one primary color in a spatial division mode or each of the plurality of pixels PX may alternately display primary colors over time in a temporal division mode, such that a desired color may be displayed by either a spatial or a temporal sum of the primary colors. The primary colors may any of various combinations of three primary colors, four primary colors, etc., but in a present exemplary embodiment, three primary colors of red (R), green (G), and blue (B) will be exemplarily described. One set of pixels PX that display different primary colors may form one dot, and one dot may display white as a display unit of a stereoscopic image. Alternatively, one pixel may be referred to as one dot. Hereinafter, one dot implies one pixel PX if there is no specific restriction. The pixels PXs in one pixel column may display the same primary color, but are not limited thereto, and pixels PXs arranged in a diagonal direction having a predetermined angle may display the same primary color.

The display panel driver 350 transmits various driving signals such as the gate signals and data signals to the display panel 300 to drive the display panel 300. The viewpoint division unit 800 divides light of an image emitted by the pixels PX of the display panel 300 and transmits the light to a plurality of viewpoints VW1, VW2, . . . , corresponding to each pixel PX. Referring to FIG. 2 or FIG. 3, the viewpoint division unit 800 according to an exemplary embodiment includes a plurality of viewpoint division units, and the plurality of viewpoint division units may include a plurality of lenticular lenses 810 arranged in one direction. Each lenticular lens 810 may extend in one direction. Different colors may be associated with each adjacent pixel row that corresponds to each lenticular lens 810. That is, different primary color may be displayed by the first pixels PX in adjacent pixel rows corresponding to each lenticular lens 810. To this end, an extension direction of each lenticular lens 810 may be inclined at an acute angle with respect to a column direction of the pixel.

An exemplary, non-limiting viewpoint division unit will be described as a lenticular lens 810. Let a distance from the stereoscopic image display device to a point where an optimal 3D image is viewed be called an optimal viewing distance (OVD), and let a location where light emitted from each pixel PX passes through the viewpoint division unit 800 at the optimal viewing distance be called a viewpoint. According to an exemplary embodiment, each of the pixels PX1 and PX of the display panel 300 corresponds to one of the plurality of viewpoints VW1 to VWn, and light emitted from the respective pixels PX1 and PX passes through the corresponding viewpoints VX1 to VWn through the viewpoint division unit 800. A viewer may view a different image with each eye from light emitted from pixels corresponding to different viewpoints, and thus may perceive depth, that is, a 3D effect.

FIG. 2 illustrates a finite number of viewpoints VW1 to VWn positioned at the optimal viewing distance OVD. As shown in FIG. 2, light of a plurality of first pixels PX arranged on the display panel 300 respectively passes through corresponding lenticular lenses, and then passes through a first viewpoint VW1 at the optimal viewing distance OVD. When one viewer eye is positioned at the first viewpoint VW1, the viewer may generally view light of the first pixel PX1 and perceive an image from the viewed light.

Referring to FIG. 3, light of pixels PX may pass through the viewpoint division unit 800 at one of the viewpoints VW1 to VWn in a unit view area RP. Each unit view area RP includes viewpoints VW1 to VWn. In addition, the unit view areas RP may periodically repeat at the optimal viewing distance OVD, and the order of the viewpoints VW1 to VWn may be the same in each unit view area RP. For example, among the plurality of pixels, a plurality of pixels that correspond to the first viewpoint are PX1, and light of the first pixel PX1 may pass the first viewpoint VW1 in any unit view areas RP by passing through the lenticular lens of the viewpoint division unit 800. As shown in FIG. 3, light of the first pixel PX1 passes through at least one lenticular lens, and then may pass through the plurality of first viewpoints VW1 at the optimal viewing distance OVD. Although FIG. 1 to FIG. 3, show one viewpoint division unit 800 as being located between the display panel 300 and the viewer, this arrangement is exemplary and non-limiting. The viewpoint division unit 800 may be disposed by a rear side of the display panel 300, and the plurality of viewpoint division units 800 may be disposed between the display panel 300 and the viewer.

The viewpoint division unit driver 850 is connected to the viewpoint division unit 800 and generates a driving signal that can drive the viewpoint division unit 800. For example, the viewpoint division unit driver 850 may generate a driving signal that stops driving the viewpoint division unit 800 if the stereoscopic image display device displays a 2D planar image. Alternatively, when the stereoscopic image display device displays a 3D image, the viewpoint division unit driver 850 may generate a driving signal that starts driving the viewpoint division unit 800.

The sensor 420 is an eye tracking sensor that senses a location and a distance of a viewer's eyes. The sensor 420 may sense a location of a center of a pupil of an observer, and sense a distance between the 3D image display device and the eye of the observer. In addition, the sensor 420 may sense a distance between the two pupils of the observer. The distance between the observer's two pupils may be a distance between the centers of the two pupils. Sense data sensed by the sensor 420 is transmitted to the LUT 410. The LUT 410 stores operation timing data corresponding to the sense data. Based on the sense data received from the sensor 420, appropriate operation timing data may be selected from the LUT 410. The selected operation timing data may be transmitted to the controller 400.

The controller 400 controls the display panel driver 350 and the viewpoint division driver 850 to provide a left-eye image and a right-eye image to both user's eyes based on the operation timing data of the sense data of the sensor 420. That is, the controller 400 performs a head tracking function. In an exemplary embodiment of FIG. 1, the display panel driver 350 and the viewpoint division driver 850 are separately provided and the controller 400 controls the display panel driver 350 and the viewpoint division driver 850, but the display panel driver 350, the viewpoint division driver 850, and the controller 400 may be integrally provided. In addition, the LUT 410 may be provided in the controller 400. Hereinafter, the viewpoint division unit 800 according to an exemplary embodiment is exemplarily described as a plurality of lenticular lenses 810.

A method applied to the plurality of lenticular lenses 810 may also be applied to a viewpoint division unit 800 that includes a parallax barrier with an opening and a light blocking unit.

Figure 4:
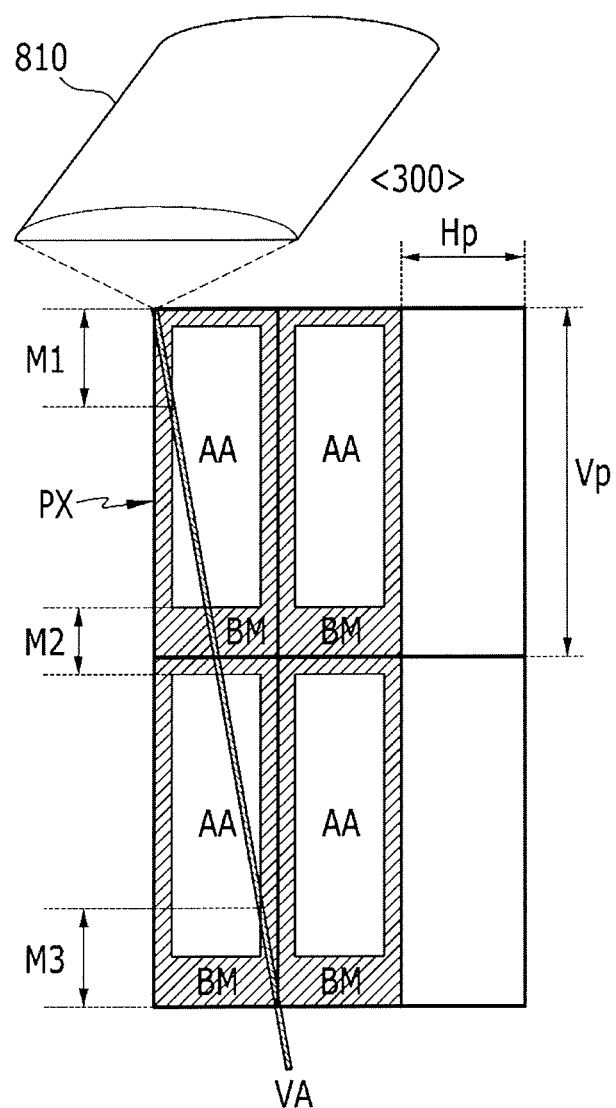
FIG. 4 illustrates a moiré phenomenon that occurs due to a black matrix area of a display panel, as enlarged or transmitted by a lenticular lens of a stereoscopic image display device.

FIG. 4 illustrates a moiré phenomenon that occurs due to a black matrix BM area of the display panel 300, as enlarged or transmitted by the lenticular lens 810 of the stereoscopic image display device. Each pixel PX may include an area AA from which light generated from a backlight unit or an organic light emitting diode is emitted, and a black matrix BM area that hides a thin film transistor from the viewer. The lenticular lens 810 may be disposed on the pixels PX with an inclination angle VA with reference to a column direction. The lenticular lens 810 may refract, transmit, or reflect light of the corresponding area. As shown in FIG. 4, when an area focused through the lenticular lens 810 is an area of a pixel PX corresponding to the line of the inclination angle VA, luminance changes due to a change in viewing position, and accordingly a moiré phenomenon may be observed. For example, based on a viewing position, luminance of a black matrix area area focused by the lenticular lens 810, e.g., M1, M2, and M3, and luminance of a light emission area AA focused by the lenticular lens 810, differ from each other, and accordingly the viewer may observe a moiré phenomenon.

Figure 5:
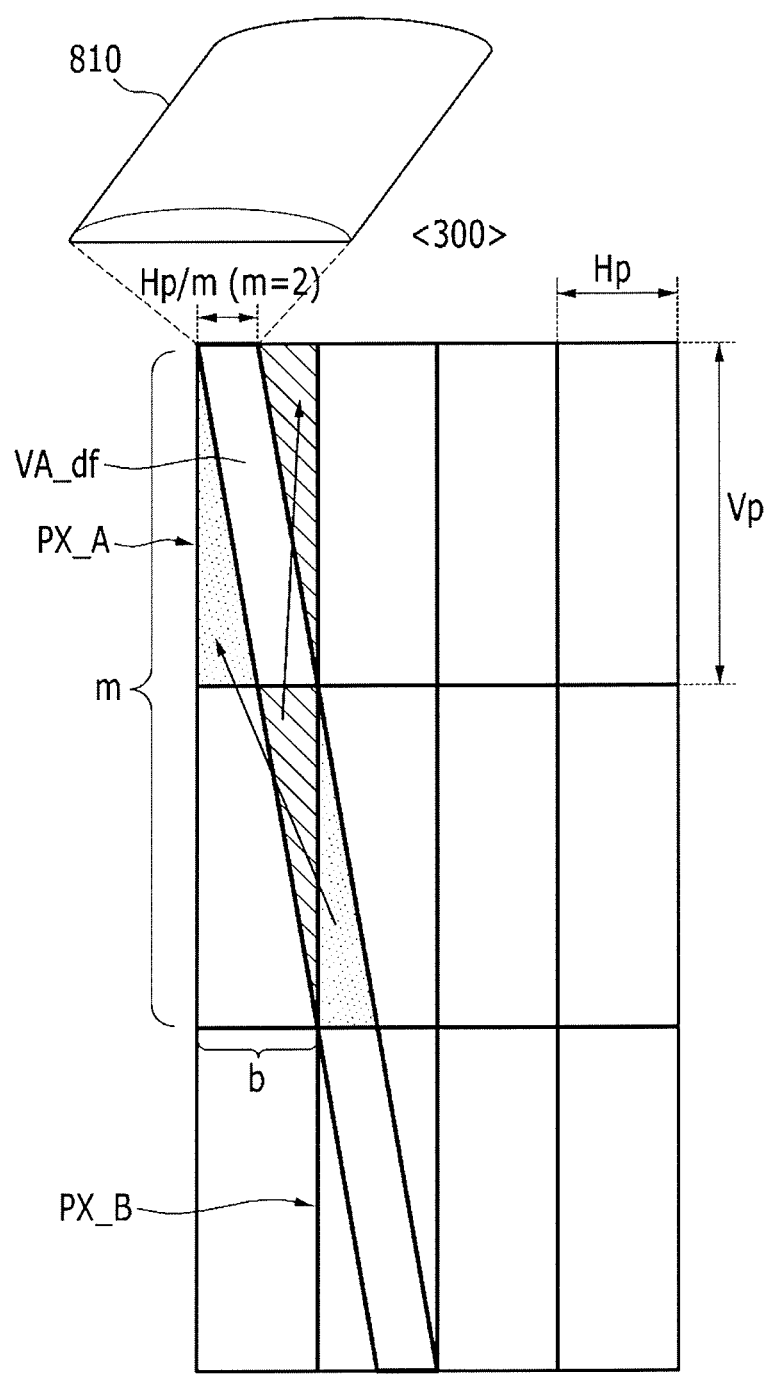
FIG. 5 illustrates an area of a display panel defocused by a lenticular lens of a stereoscopic image display device according to an exemplary embodiment.

A method for designing a lenticular lens 810 that can substantially prevent a moiré phenomenon from being perceived will be described with reference to FIG. 5. FIG. 5 illustrates an area of the display panel 300 defocused by the lenticular lens 810 of a stereoscopic image display device according to an exemplary embodiment. As shown in FIG. 5, the lenticular lens 810 can defocus an area of horizontal width Hp/m of a pixel PX of horizontal pitch HP at the optimal viewing distance OVD by changing a focal distance of the lenticular lens 810. For example, the focal distance of the lenticular lens 810 of FIG. 5 is set to be longer than the focal distance of the lenticular lens 810 in FIG. 4 so that a planar-shaped area of horizontal width HP/m is defocused. In addition, m may be defined as follows. A plurality of second pixels are arranged in the display panel 300 to display an image at one viewpoint. Among the plurality of second pixels, light of third pixels PX_A and PX_B pass through the same lenticular lens of the viewpoint division unit and thus pass the same viewpoint. In this case, each of the plurality of third pixels PX_A and PX_B has a unit of m×b. That is, m may be a column directional unit, and b may be a row directional unit of the alignment of the plurality of third pixels PX_A and PX_B. PX_A and PX_B are examples of the third pixels. As described, the focal distance of the lenticular lens 810 is controlled by the inclination angle VA of the viewpoint division unit 800 so that the lenticular lens 810 can form a defocused area of width Hp/m in the display panel 300

Thus, although the viewing position has changed, an area VA−df viewed through a single lenticular lens 810 has substantially the same area as one pixel PX so that luminance does not change due to a location of the viewer, and accordingly, occurrence of a moiré phenomenon can be prevented regardless of the opening shape of each pixel PX.

Figure 6:
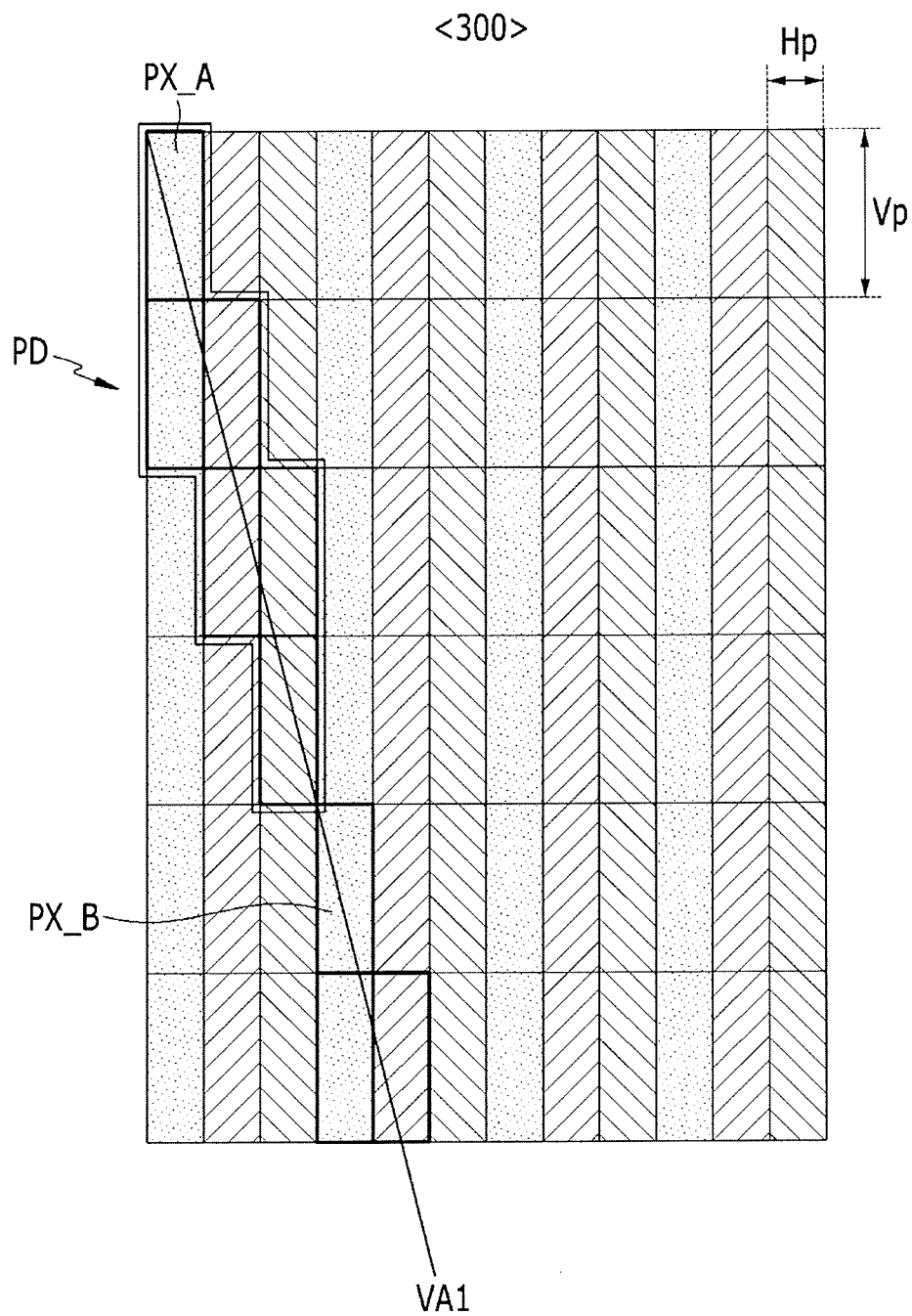
FIG. 6 illustrates proximate pixels that correspond to an inclination angle of a lenticular lens according to an exemplary embodiment.

Hereinafter, a proximate pixel set PD based on the inclination angle of the lenticular lens 810 of a stereoscopic image display device according to an exemplary embodiment will be described with reference to FIG. 6. The proximate pixel set PD includes second pixels arranged in an area of unit of m×b that emit light transmitted through the same lenticular lens. FIG. 6 illustrates a proximate pixel set PD that corresponds to the inclination angle of the lenticular lens of a stereoscopic image display device according to an exemplary embodiment.

The inclination angle of the lenticular lens 810 according to an exemplary embodiment can be given as Equation 1:

$$VA = \tan^{-1}\frac{b \times Hp}{m \times Vp}. \quad \text{(Equation 1)}$$

Here, VA denotes an inclination angle of an extension direction of the lenticular lens 810 with respect to the column direction, Hp denotes a horizontal direction pitch of the pixel PX, and Vp denotes a vertical direction pitch of the pixel PX. Herein, b and m are respectively natural numbers. Light respectively emitted from pixels PX whose inclination angle lines overlap each other transmit through the same lens and may be viewed as an image with through the same viewpoint at a viewing position at the optimal viewing distance. A next pixel PX_B in the same viewpoint viewed through the same lenticular lens 810 as a pixel PX_A that displays an image of a given viewpoint is located b columns rightward and m rows downward from the pixel PX_A. The proximate pixel set PD is a group of pixels arranged in an area defined by an m×b unit between the pixel PX_A and the pixel PX_B as viewed through the same lenticular lens 810. Pixels of the proximate pixel set PD may display an image corresponding to different viewpoints or may display an image corresponding to the same viewpoint.

Let an inclination angle VA1 of the lenticular lens 810 is given as in Equation 1, then the number of pixels of the proximate pixel set PD displaying an image of the same viewpoint may be given as in Equation 2: (Equation 2)

$$n=b+m-1. \quad \text{(Equation 2)}$$

Here, n denotes the number of pixels forming the proximate pixel set PD, and b and m are respectively natural numbers. For example, as shown in FIG. 6, if the inclination angle of the lenticular lens 810 is a first inclination angle VA1, m=4, b=3, and the number of pixels of the proximate pixel set PD is 6. In this case, when images of different viewpoints are displayed in neighboring proximate pixel sets PD, six pixels form one proximate pixel set PD and display one viewpoint image in the stereoscopic image display device.

Figure 7:
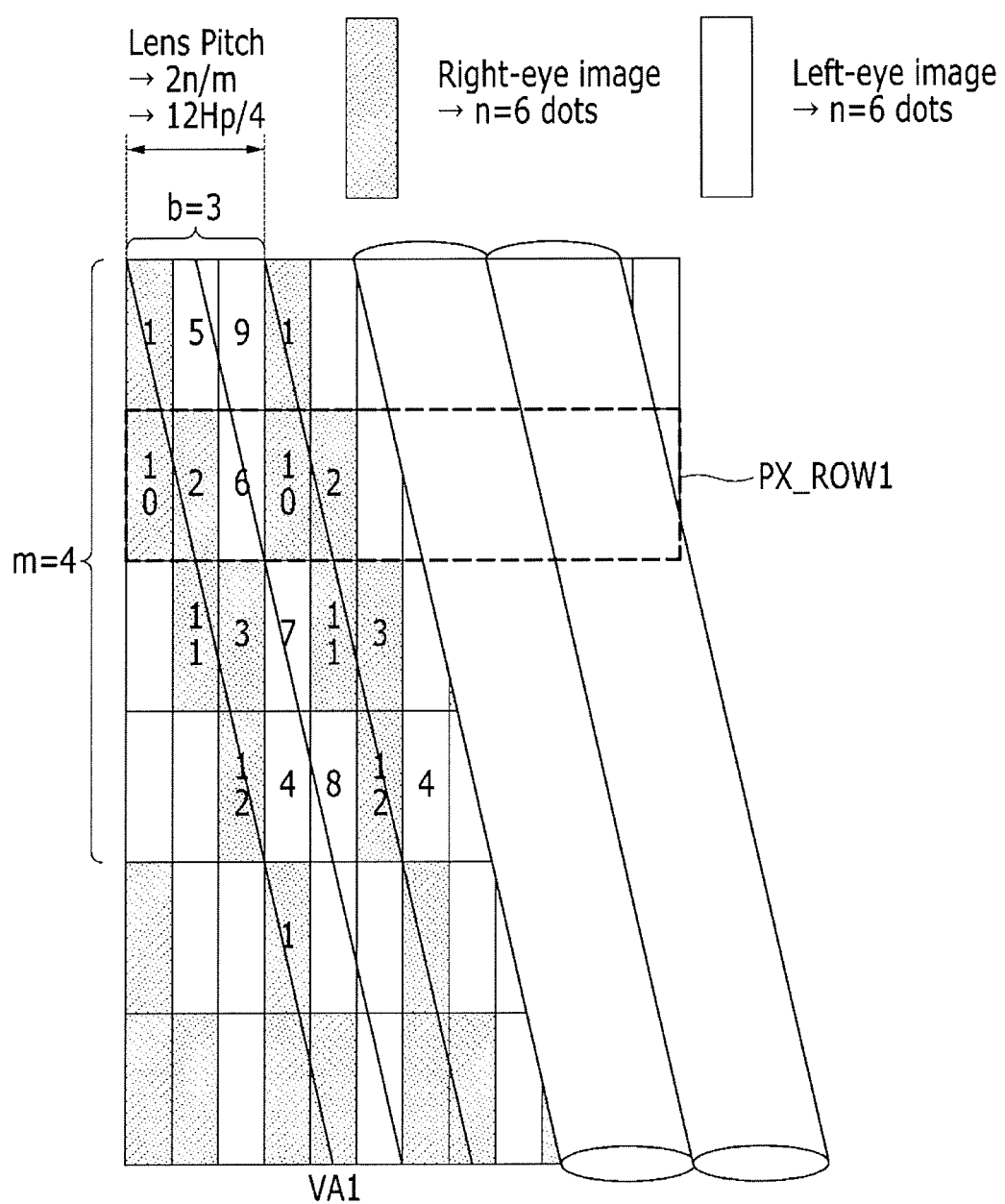
FIG. 7 and FIG. 8 illustrate head tracking as performed by a stereoscopic image display device according to an exemplary embodiment.
Figure 8:
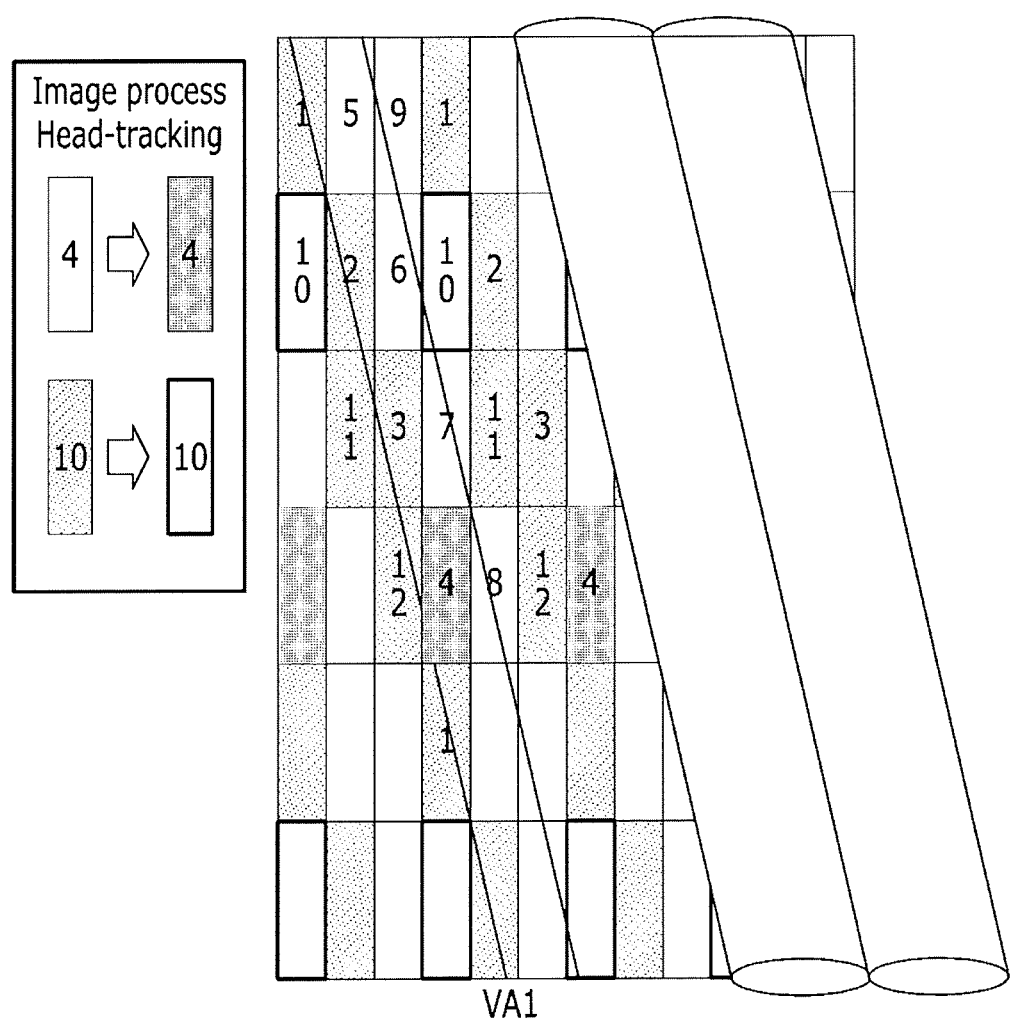

Next, let the inclination angle of the lenticular lens 810 and the number of pixels that form a proximate pixel set PD be predetermined in an exemplary embodiment. Then, a stereoscopic image display device that displays a first viewpoint image and a second viewpoint image in each of neighboring proximate pixel sets PD will be described with reference to FIG. 7 to FIG. 11. FIG. 7 and FIG. 8 illustrate a stereoscopic image display device performing head tracking according to an exemplary embodiment.

A pitch of the lenticular lens 810 of a stereoscopic image display device displaying the first viewpoint image and the second viewpoint image in each of the neighboring proximate pixel sets PD can be calculated as given in Equation 3:

$$LP = \frac{2n}{m}. \quad \text{[Equation 3]}$$

Here, LP denotes a pitch of the lenticular lens 810, n denotes the number of pixels forming a proximate pixel set PD, and m is a natural number. In addition, a unit of the pitch of the lenticular lens 810 as calculated by Equation 3, is referred to as a dot. The pitch of the lenticular lens 810 shown in FIG. 7 and FIG. 8, as calculated by Equation 3 is three dots, and the three dots correspond to a horizontal pitch HP of three pixels PX.

Referring to FIG. 7, a right-eye image, hereinafter referred to as an R image, may be displayed in a proximate pixel set PD that includes first to third pixels 1 to 3 and tenth to twelfth pixel 10 to 12, and a left-eye image, hereinafter referred to as an L image, may be displayed in a proximate pixel set PD that includes fourth to ninth pixel 4 to 9. Then, the R image may be transmitted through the lenticular lens 810 and thus viewed at a first viewing position, and the L image may be transmitted through the lenticular lens 810 and thus viewed at a second viewing position, both at the optimal viewing distance. In this case, the first viewing position and the second viewing position may respectively correspond to locations of both eyes of the viewer at the optimal viewing distance OVD. When the R image and the L image are transmitted through the lenticular lens 810 and to the locations of both eyes of the viewer, the viewer may perceive the R image and the L image together as a 3D image. However, when a location of the viewer's head or the locations of both viewer's eyes change at the optimal viewing distance OVD, the location of the viewer and the image passed through the lenticular lens 810 no longer correspond to each other, so that the L image may be viewed by the right eye or the R image may be viewed by the left eye, thereby causing crosstalk. When crosstalk occurs, the viewer cannot perceive a normal stereoscopic image.

In FIG. 8, the inclination angle line has been moved to the right side compared to the inclination angle line of FIG. 7 based on the changed head location of the viewer or the changed eye locations of the viewer. In the changed viewing positions at the optimal viewing distance, an image displayed by pixels corresponding to the moved inclination angle line is viewed. A sensor may detect the changed head location of the viewer or the changed eye locations of the viewer. The controller 400 may change an image displayed in a pixel PX of a proximate pixel set PD based on the detected location. In more detail, the controller 400 may display an R image in a proximate pixel set PD that includes first to fourth pixels 1 to 4, an eleventh pixel 11, and a twelfth pixel 12, and may display an L image in a proximate pixel set PD that includes fifth to tenth pixels 5 to 10.

Figure 9:
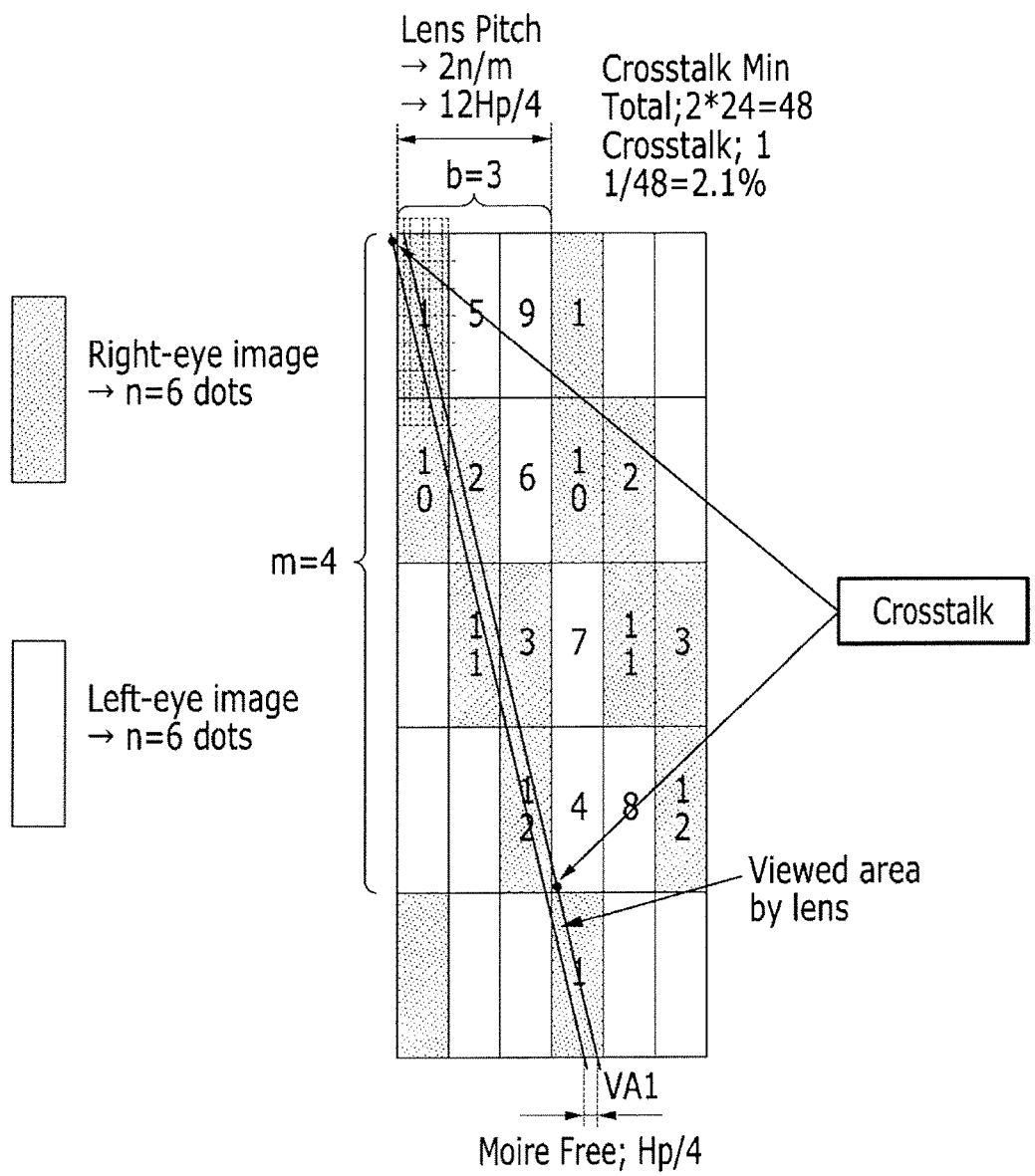
FIG. 9 to FIG. 11 illustrates crosstalk that occurs due to head tracking performed by a stereoscopic image display device according to an exemplary embodiment.
Figure 10:
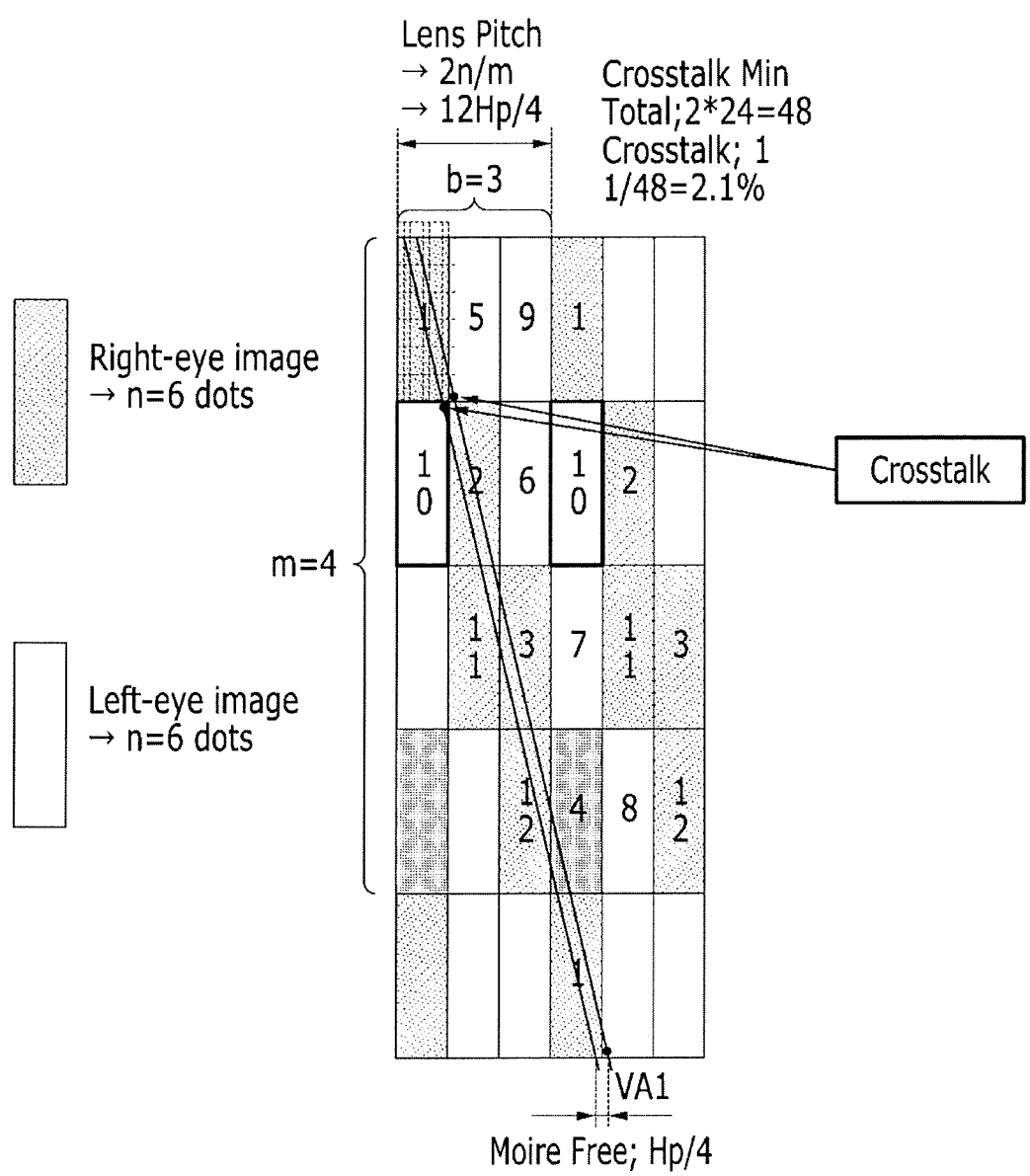
Figure 11:
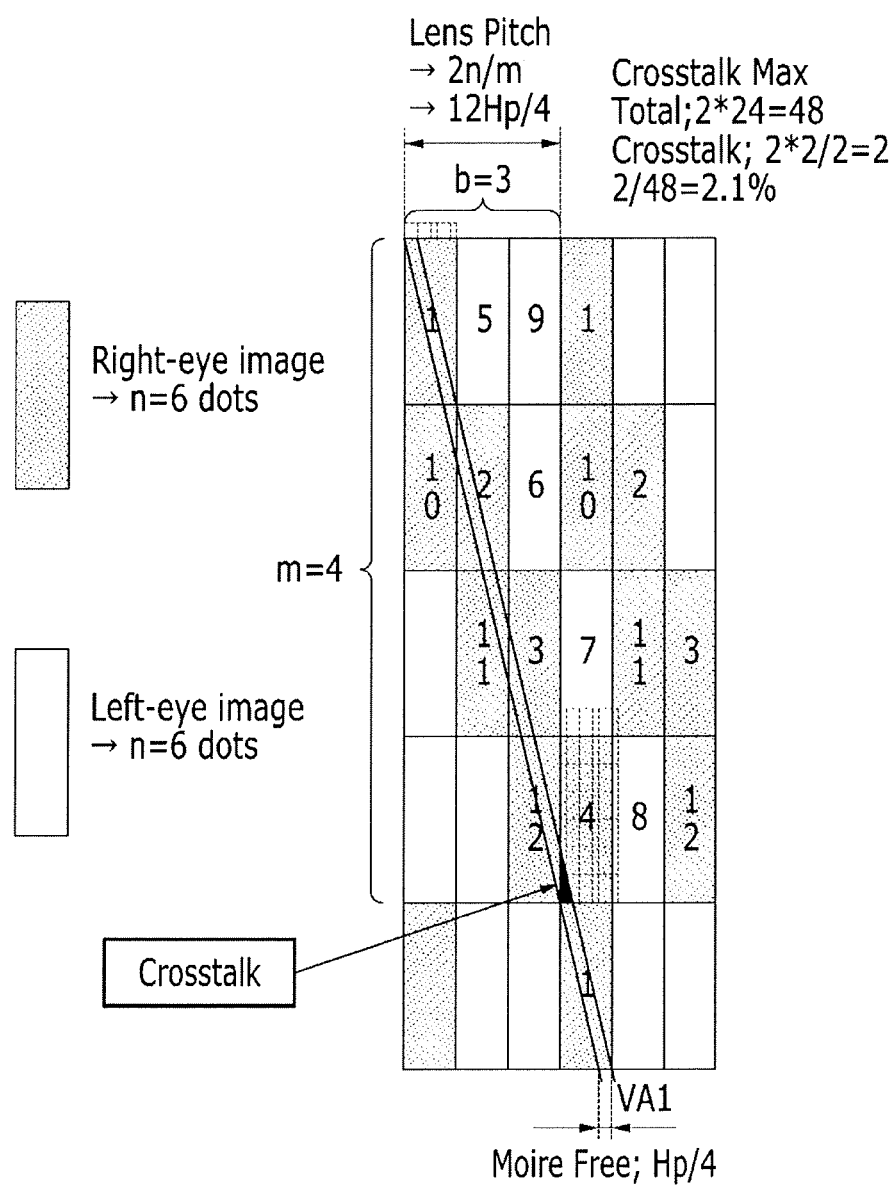

FIG. 9 to FIG. 11 illustrate crosstalk that occurs due to head tracking of a stereoscopic image display device according to an exemplary embodiment. In FIG. 9 to FIG. 11, an inclination angle of the lenticular lens 810 is the first inclination angle VA1, m=4, b=3, and the number of pixels forming a proximate pixel set PD is 6. In addition, to prevent occurrence of a moiré phenomenon, a pixel area of horizontal width Hp/4 becomes a defocused area in the lenticular lens 810. An area of horizontal width Hp/4 along the inclination angle VA1 may be viewed through the lenses in four rows, which may be 48 areas if one dot is divided into 48 areas. Referring to FIG. 9, the number of areas where crosstalk occurs may be one of the four rows. Then, a crosstalk occurrence ratio is 1/48, which corresponds to 2.1% of a total. Referring to FIG. 10, if an image displayed in the pixel PX changes due to head tracking, there may be one area in the four rows where crosstalk occurs. Then, a crosstalk occurrence ratio is 1/48, which corresponds to 2.1% of the total. FIG. 11 illustrates a case in which maximum crosstalk occurs, where crosstalk may occur in two areas of the four rows. There, a crosstalk occurrence ratio is 2/48, which is 4.2% of the total. As described with reference to FIG. 9 to FIG. 11, in a stereoscopic image display device according to an exemplary embodiment, crosstalk occurs with a ratio of 2.1% to 4.2% so that the occurrence of crosstalk can be suppressed.

Figure 12:
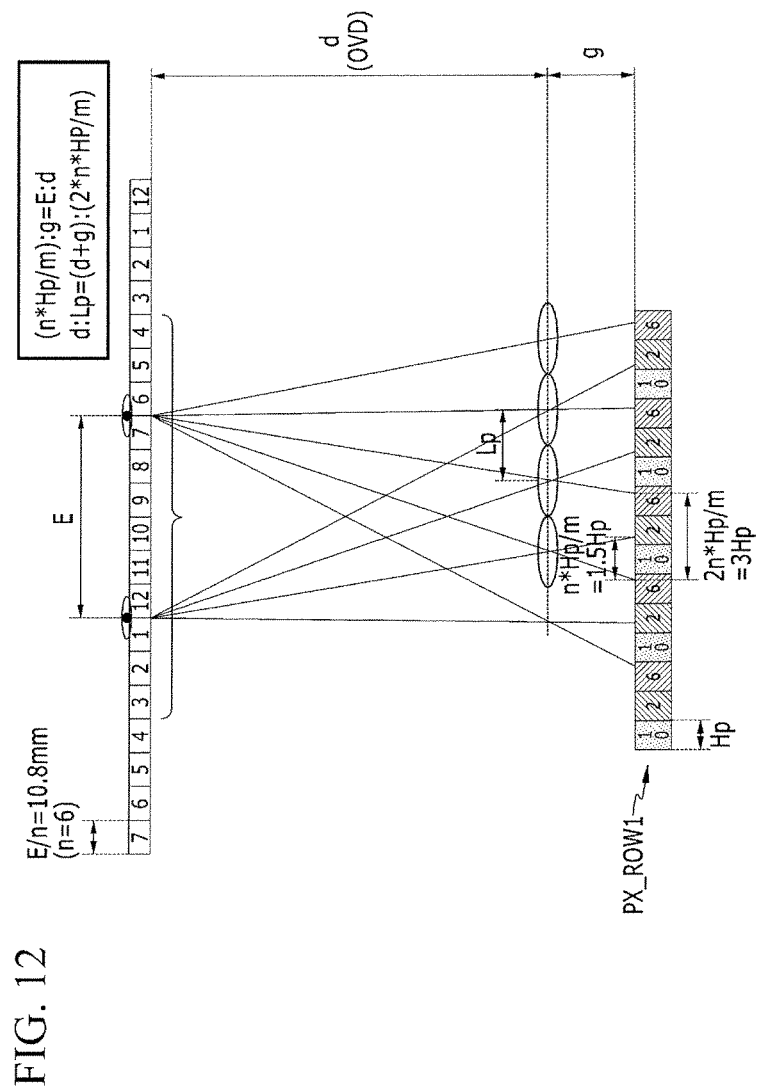
FIG. 12 illustrates a pixel row PX_ROW1 transmitted through a lenticular lens and viewed at an optimal viewing distance OVD according to an exemplary embodiment.

Next, referring to FIG. 12, a method for designing the lenticular lens 810 when the image of the pixel row of FIG. 7 is transmitted through the lenticular lens 810 and then viewed at the optimal viewing distance OVD will be described. FIG. 12 illustrates a pixel row PX_ROW1 transmitted through the lenticular lens 810 and viewed at the optimal viewing distance OVD according to an exemplary embodiment. Referring to FIG. 12, letting the optimal viewing distance OVD be denoted as d and a distance between the lenticular lens 810 and the display panel 300 be g, a pitch LP of the lenticular lens 810 may satisfy Equation 4.

$$\left(\frac{n}{m} \times Hp\right):g = E:d, \quad \text{(Equation 4)}$$

$$d:Lp = (d+g):\left(2 \times \frac{n}{m} \times Hp\right)$$

Here, m is a natural number, E denotes a distance between both eyes of a viewer, and n denotes the number of pixels included in a proximate pixel set PD. A viewing area having a width of E/n respectively at the optimal viewing distance OVD may be formed by n pixels PX displaying an L image and an R image in m of rows. Thus, n pixels PX may form one viewpoint image area within a width of E between both eyes of the viewer at the optimal viewing distance OVD. The controller 400 may change pixels where the L image and the R image are displayed according to movement of the viewer at the optimal viewing distance OVD. The controller 400 defines a control unit as a viewing area having a width of E/n at the optimal viewing distance OVD, and performs head tracking based on the control unit and changes pixels where the L image and the R image are displayed. For example, when the left-eye of the viewer moves from a first location to a second location of the optimal viewing distance OVD and a distance between the first location and the second location exceeds E/n, the controller 400 changes the pixels displaying the L image so as to correspond to the second location.

Figure 13:
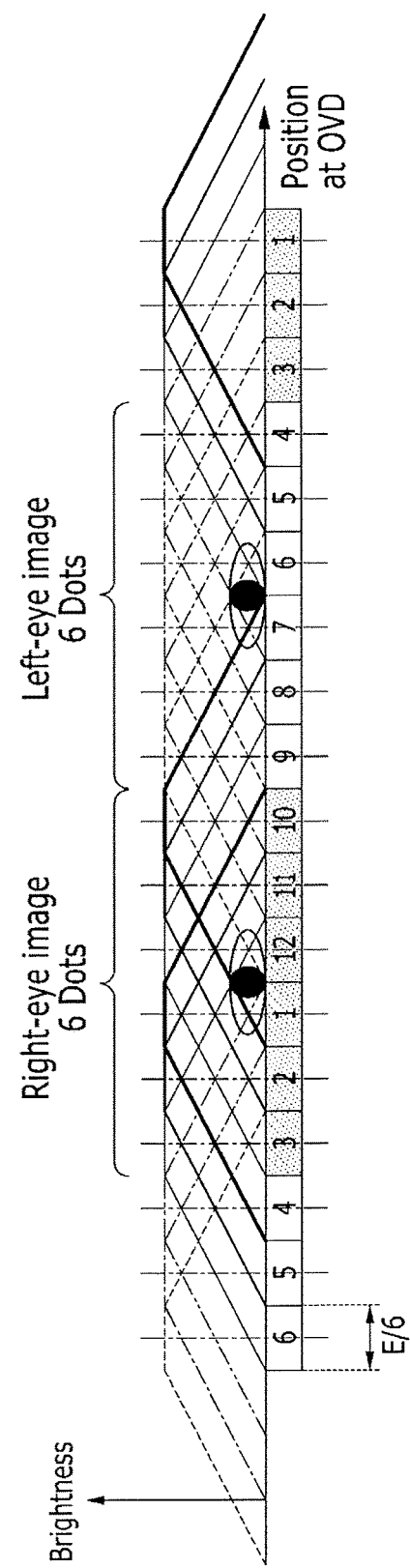
FIG. 13 and FIG. 14 illustrates pixels PX viewed at an optimal viewing distance OVD due to head tracking of a stereoscopic image display device according to an exemplary embodiment.
Figure 14:
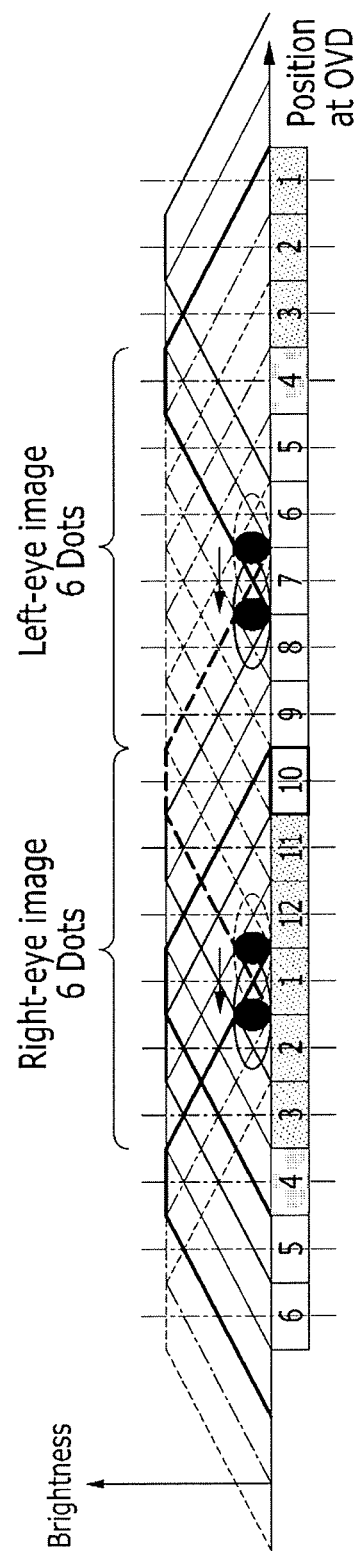

A method for the controller 400 to change pixels displaying an L image and an R image will be described with reference to FIG. 13 and FIG. 14. FIG. 13 and FIG. 14 illustrate pixels PX viewed at the optimal viewing distance OVD due to head tracking of a stereoscopic image display device according to an exemplary embodiment. As shown in FIG. 13, as the eyes of the viewer move to the left side or to the right side at the optimal viewing distance OVD, the number of dots viewed by the right eye or the left eye of the viewer becomes 6. For example, when the viewer's eyes move while the first to third pixels 1 to 3 and the tenth to twelfth pixels 10 to 12 are viewed by the right eye and the fourth to ninth pixels 4 to 9 are viewed by the left-eye, the right-eye views a part of the fourth pixel 4 together with the first to third pixels 1 to 3 and the left-eye views a part of the tenth pixel 10 together with the seventh to ninth pixels 7 to 9, so that crosstalk may occur. To suppress the occurrence of crosstalk, the stereoscopic image display device performs head tracking to display the R image in the fourth pixel 4 and display the L image in the tenth pixel 10. Then, the first to fourth pixels 1 to 4 and the eleventh and twelfth pixels 11 and 12 where the R image is displayed are viewed by the right eye and the fifth to tenth pixel 5 to 10 are viewed by the left eye to suppress crosstalk that may occur when the viewer moves.

Figure 15:
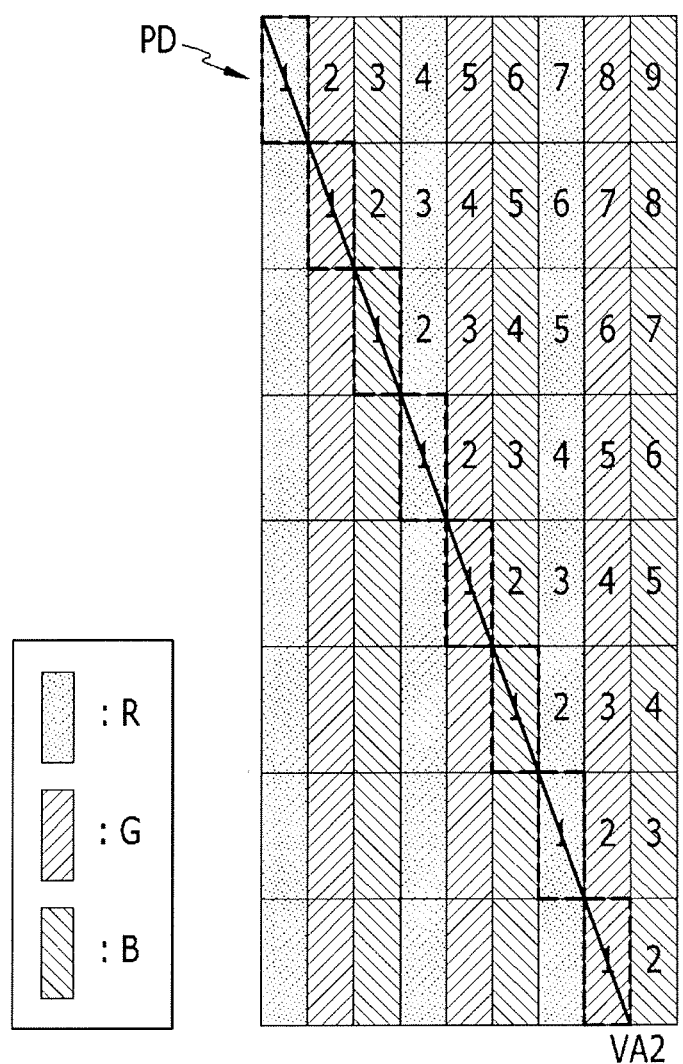
FIG. 15 to FIG. 19 illustrate adjacent pixels PX that correspond to an inclination angle of a lenticular lens of a stereoscopic image display device according to exemplary embodiments.
Figure 16:
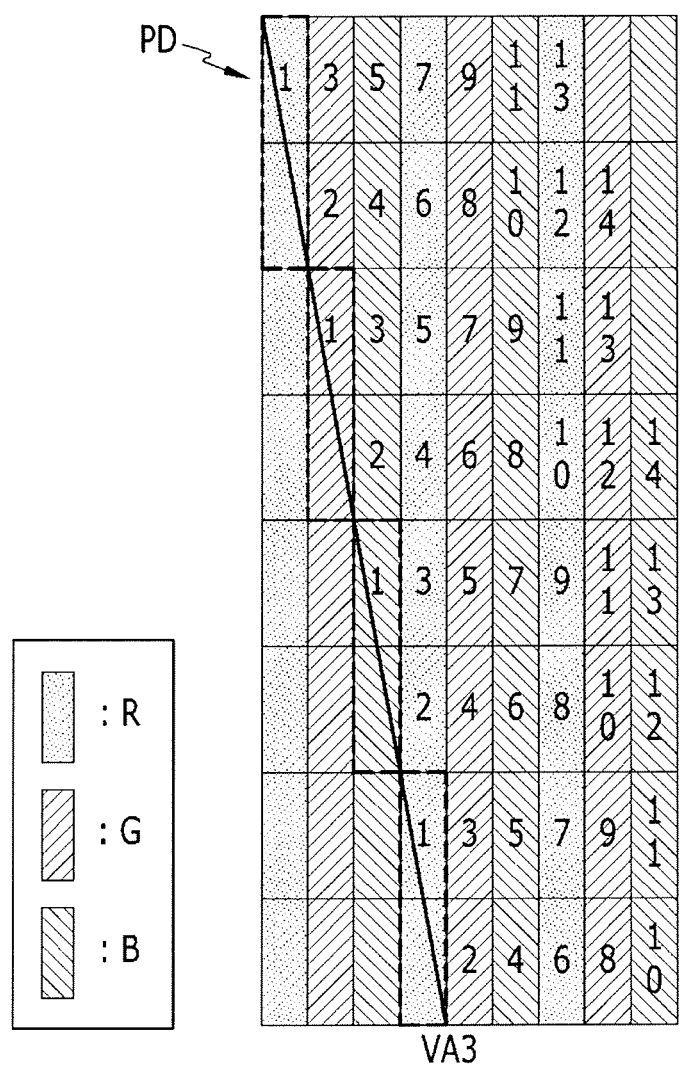
Figure 17:
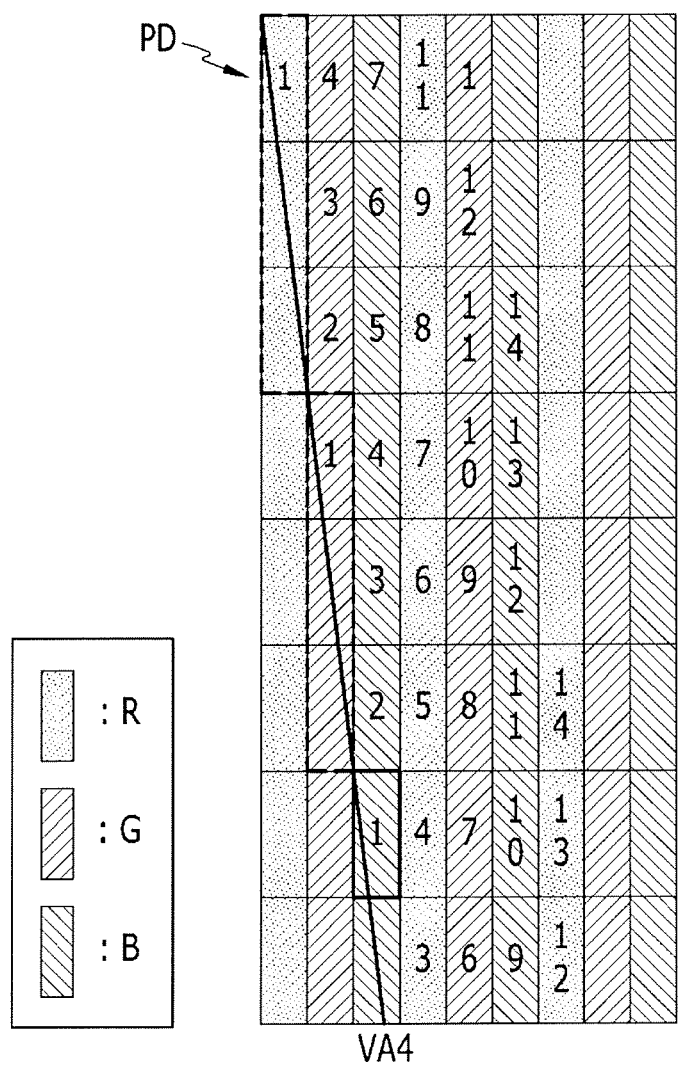
Figure 18:
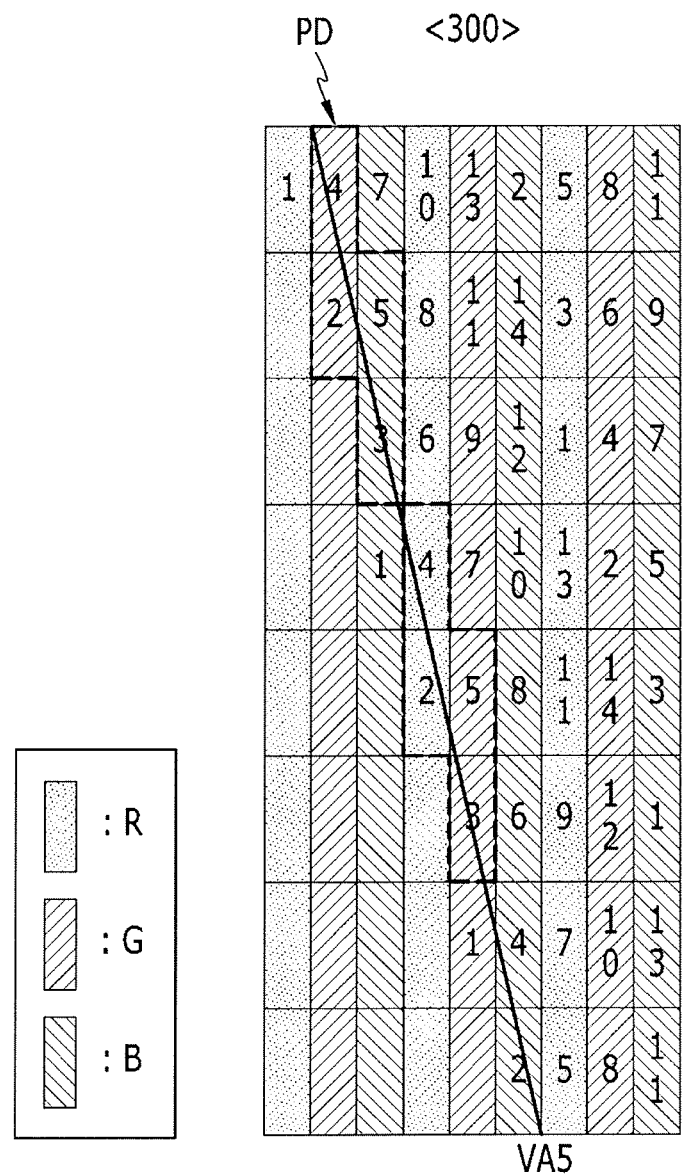
Figure 19:
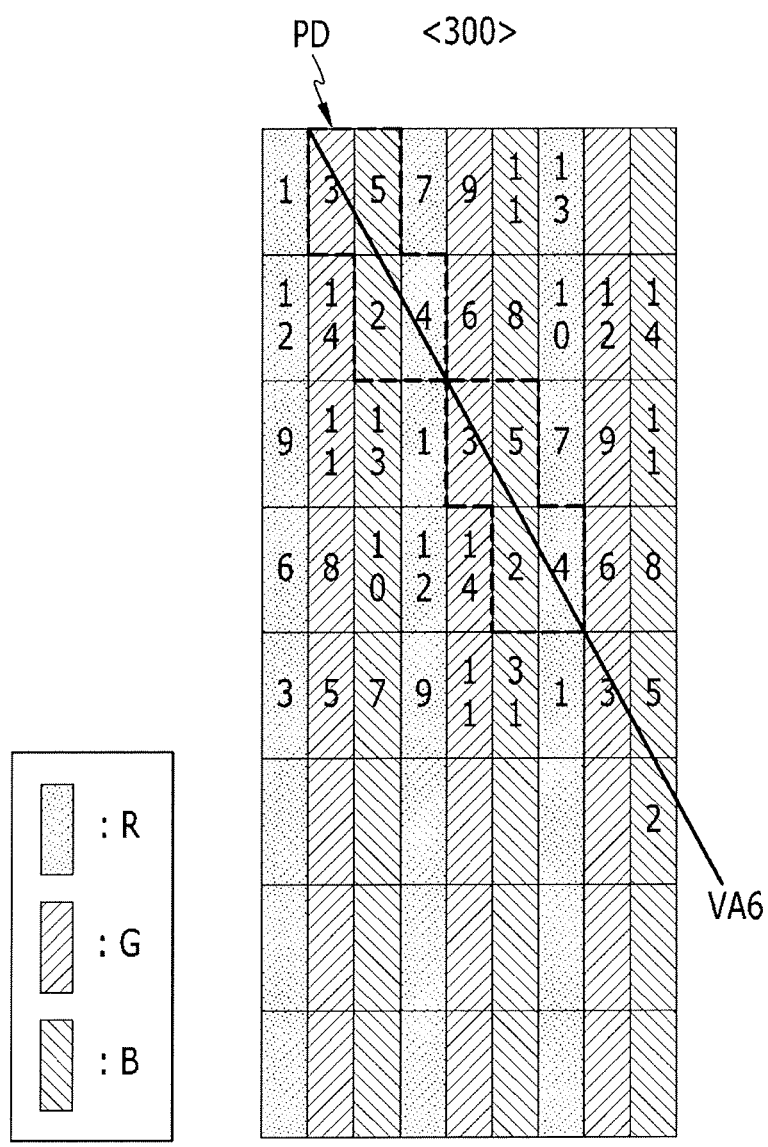

FIG. 15 to FIG. 19 illustrate adjacent pixels PX that corresponding to an inclination angle of the lenticular lens 810 of a stereoscopic image display device according to exemplary embodiments. The inclination angle of the extension direction with respect to a column direction of each lenticular lens 810 of the viewpoint division unit 800 of the stereoscopic image display device may vary. Hereinafter, the inclination angle will be referred to as an inclination angle of the viewpoint division unit 800. In detail, FIG. 15 illustrates a proximate pixel set PD with respect to a second inclination angle VA2, FIG. 16 illustrates a proximate pixel set PD with respect to a third inclination angle VA3, FIG. 17 illustrates a proximate pixel set PD with respect to a fourth inclination angle VA4, FIG. 18 illustrates a proximate pixel set PD with respect to a fifth inclination angle VA5, and FIG. 19 illustrates a proximate pixel set PD with respect to a sixth inclination angle VA6.

Referring to FIG. 15, let the inclination angle of the lenticular lens 810, that is, the inclination angle of the viewpoint division unit 800, be the second inclination angle VA2, then m=1 and b=1. In this case, the number of pixels that form a proximate pixel set PD as calculated by Equation 2 is 1. Each proximate pixel set PD corresponds to one pixel.

Referring to FIG. 16, let the inclination angle of the viewpoint division unit 800 be VA3, then m=2 and b=1. In this case, the number of pixels that form a proximate pixel set PD as calculated by Equation 2 is 2. Each proximate pixel set PD corresponds to pixels that are adjacent to each other in a column direction.

Referring to FIG. 17, let an inclination angle of the viewpoint division unit 800 be the fourth inclination angle VA4, then m=3 and b=1. In this case, the number of pixels that form a proximate pixel set PD as calculated by Equation 2 is 3. Each proximate pixel set PD corresponds to three pixels adjacent to each other in a column direction.

Referring to FIG. 18, let an inclination angle of the viewpoint division unit 800 be the fifth inclination angle VA5, then m=3 and b=2. In this case, the number of pixels that form the proximate pixel set PD as calculated by Equation 2 is 4. Each proximate pixel set PD includes four pixels, arranged two by two in each of two adjacent columns with the pixels in one column offset by one pixel.

Referring to FIG. 19, let an inclination angle of the viewpoint division unit 800 be the sixth inclination angle VA6, then m=2 and b=3. In this case, the number of pixels that form a proximate pixel set PD as calculated by Equation 2 is 4. Each proximate pixel set PD includes four pixels, arranged two by two in each of two adjacent rows, with the pixels in one row offset by one pixel.

Figure 20:
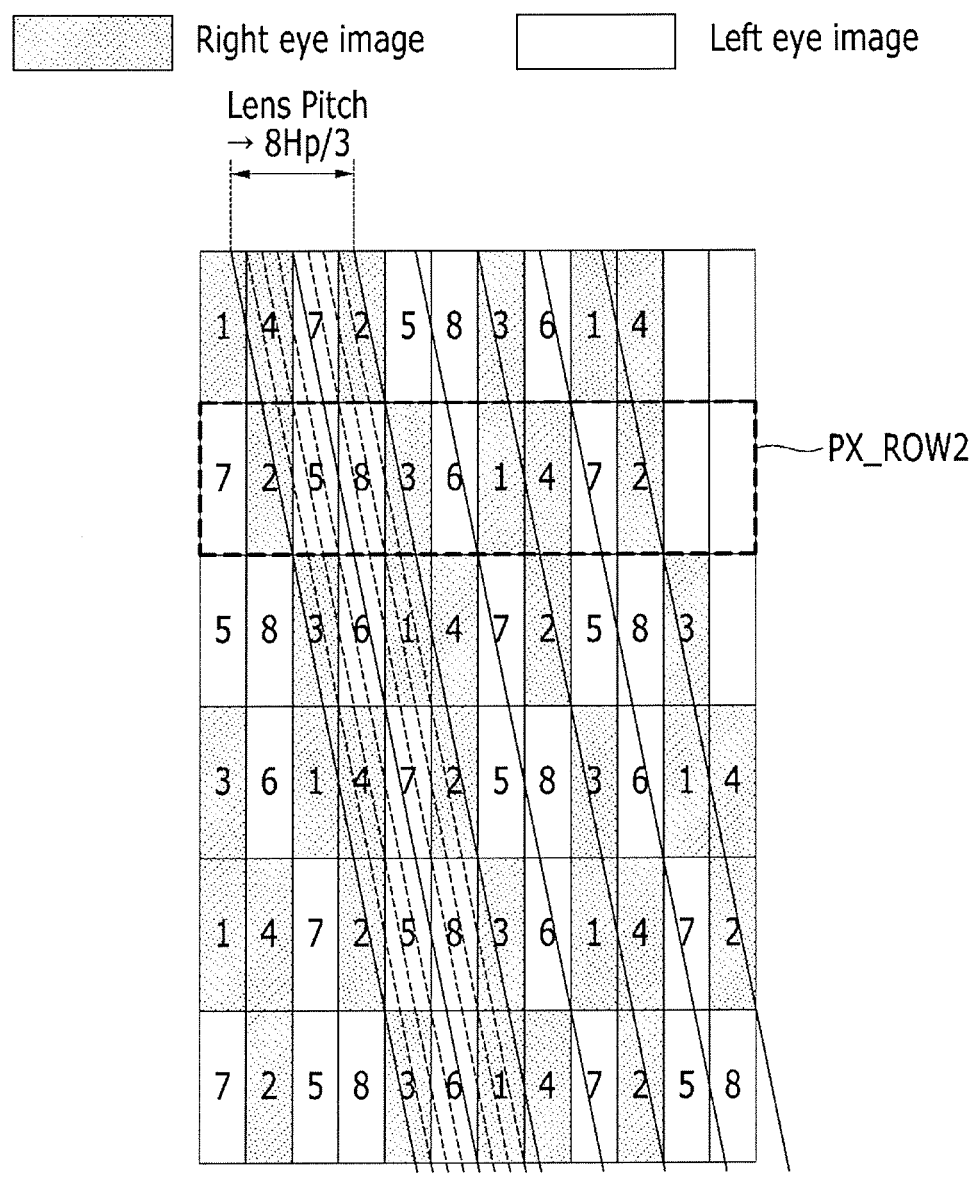
FIG. 20 and FIG. 21 illustrate head tracking as performed by a stereoscopic image display device according to an exemplary embodiment.
Figure 21:
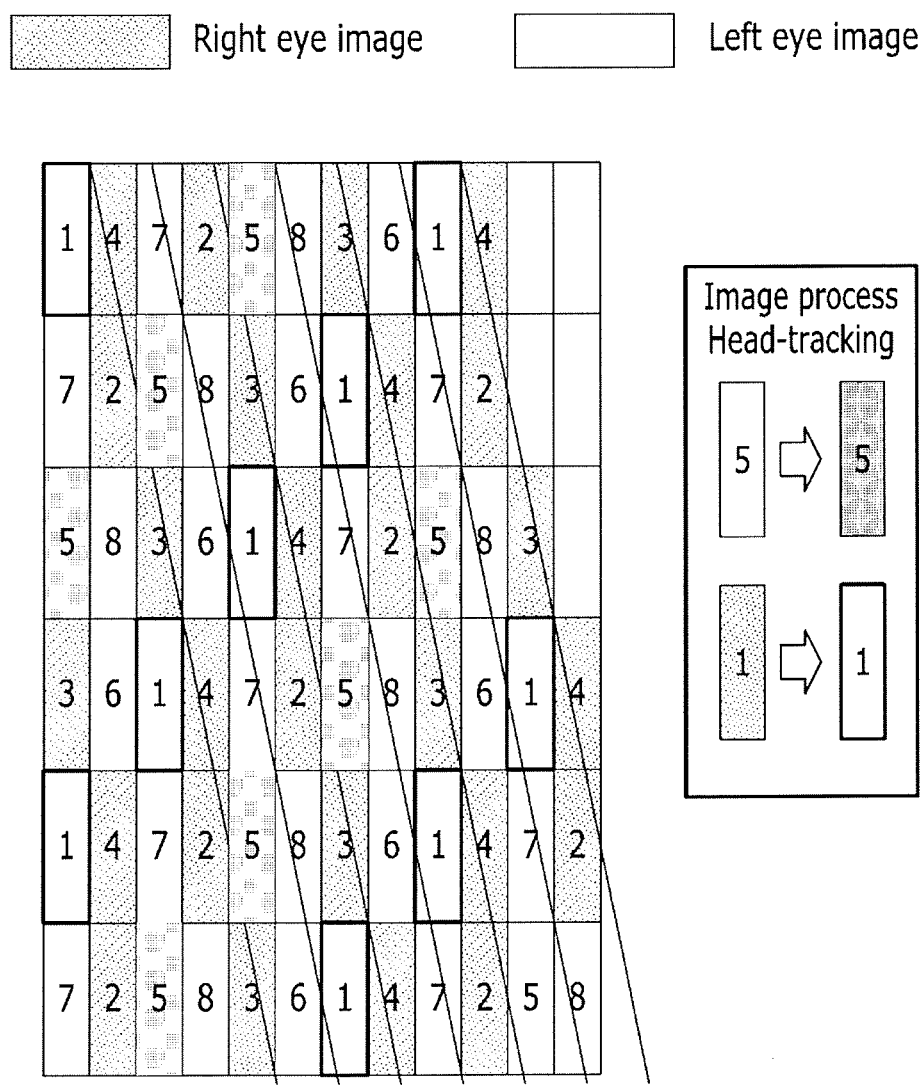

Next, letting an inclination angle of the lenticular lens 810 and the number of pixels forming a proximate pixel set PD be predetermined according to another exemplary embodiment, a stereoscopic image display device displaying a first viewpoint image and a second viewpoint image in each of neighboring proximate pixel sets PD will be described with reference to FIG. 20 to FIG. 25. FIG. 20 and FIG. 21 illustrate head tracking as performed by a stereoscopic image display device according to an exemplary embodiment. In FIG. 20 to FIG. 25, the inclination angle of the lenticular lens 810 as calculated by Equation 1 is tan−1 (2Hp/3Vp) and the number of pixels that form a proximate pixel set PD as calculated by Equation 2 is 4. In addition, a pitch of the lenticular lens 810 as calculated by Equation 3, is 8/3 dots.

Referring to FIG. 20, an R image may be displayed in a proximate pixel set PD that includes first to fourth pixels 1 to 4 and an L image may be displayed in a proximate pixel set PD that includes fifth to eighth pixels 5 to 8. The R image is transmitted through the lenticular lens 810 and is viewed at the first viewing position at the optimal viewing distance OVD, and the L image is transmitted through the lenticular lens 810 and is viewed at the second viewing position of the optimal viewing distance OVD. In this case, the first viewing position and the second viewing position may correspond to locations of both eyes of the viewer at the optimal viewing distance OVD. When the R image and the L image are respectively transmitted through the lenticular lens 810 and reach the locations of both eyes of the viewer, the viewer perceives the R image and the L image together as a 3D image having depth. However, when a location of the viewer's head or the locations of both viewer's eyes change at the optimal viewing distance OVD, a location where an image transmitted through the lenticular lens 810 and a location of the viewer no longer correspond to each other so that an L image may be viewed by the right eye or an R image may be viewed by the left eye of the viewer, thereby causing crosstalk. When crosstalk occurs, the viewer cannot perceive a normal 3D image.

In FIG. 21, the inclination angle line has moved to the right side compared to the inclination angle line of FIG. 20 due to a changed head location or the changed eye locations of the viewer. At the changed viewing position of the optimal viewing distance OVD, an image displayed in pixels corresponding to the moved inclination angle line is viewed. The sensor may detect the changed head location of the viewer or the changed eye locations of the viewer. The controller 400 may change an image displayed in pixels PX included in a proximate pixel set PD based on the detected location. In detail, the controller 400 displays the R image in a proximate pixel set PD that includes second to fifth pixels 2 to 5 and the L image in a proximate pixel set PD that includes first and sixth to eight pixels 1 and 6 to 8.

Figure 22:
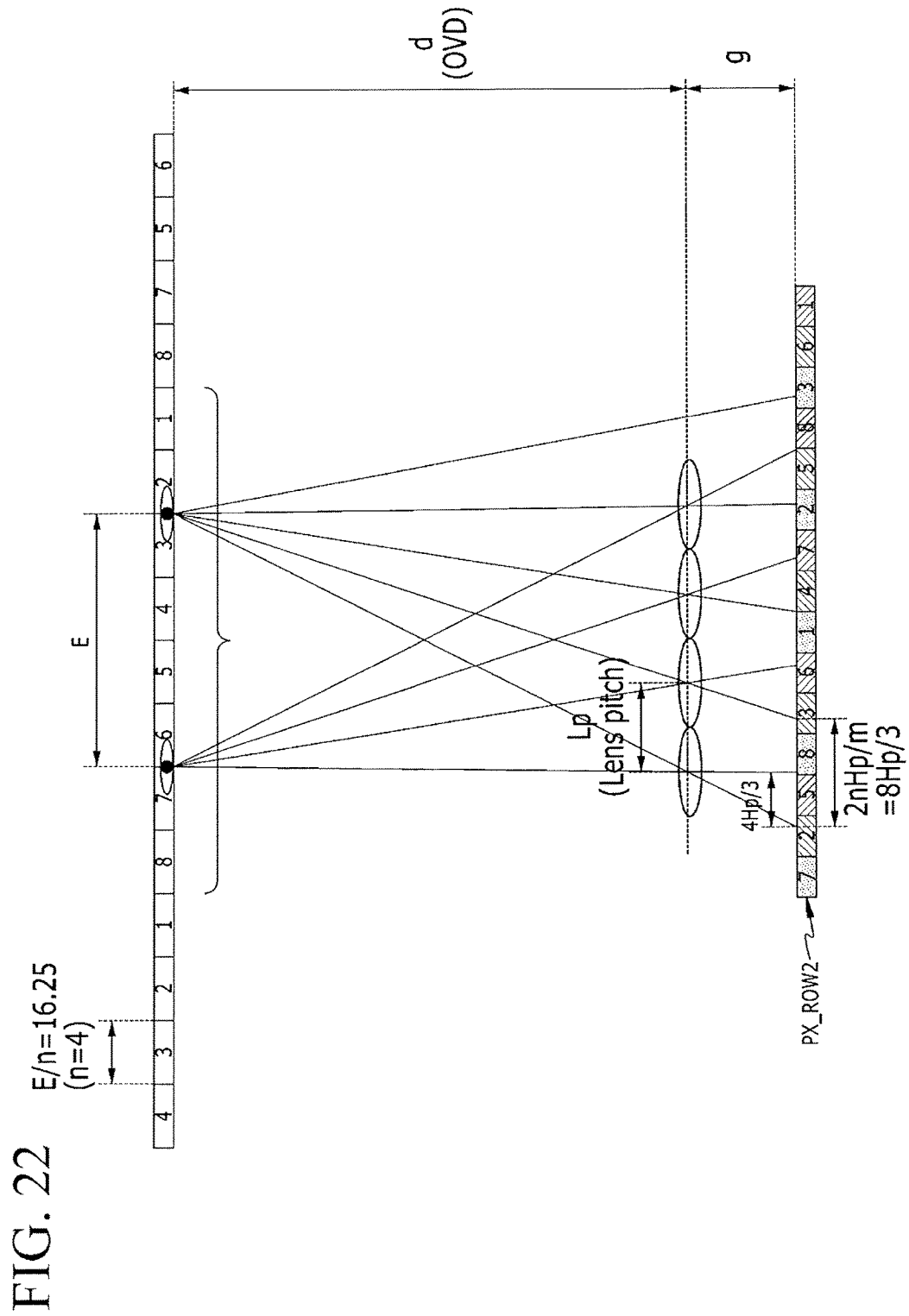
FIG. 22 illustrates a pixel row transmitted through a lenticular lens and viewed at an optimal viewing distance OVD according to an exemplary embodiment.

Next, referring to FIG. 22, a method for designing the lenticular lens 810 when an image of the pixel rows of FIG. 20 is transmitted through the lenticular lens 810 and viewed at the optimal viewing distance OVD will be described. FIG. 22 illustrates pixel row PX_ROW2 transmitted through the lenticular lens 810 and viewed at the optimal viewing distance OVD according to an exemplary embodiment. Letting the optimal viewing distance OVD be denoted as d, a distance between both eyes of the viewer be denoted as E, and a distance between the lenticular lens 810 and the display panel 300 be denoted as g, a pitch of the lenticular lens 810 satisfies Equation 4. In FIG. 22, m is 3 and n is 4.

Figure 23:
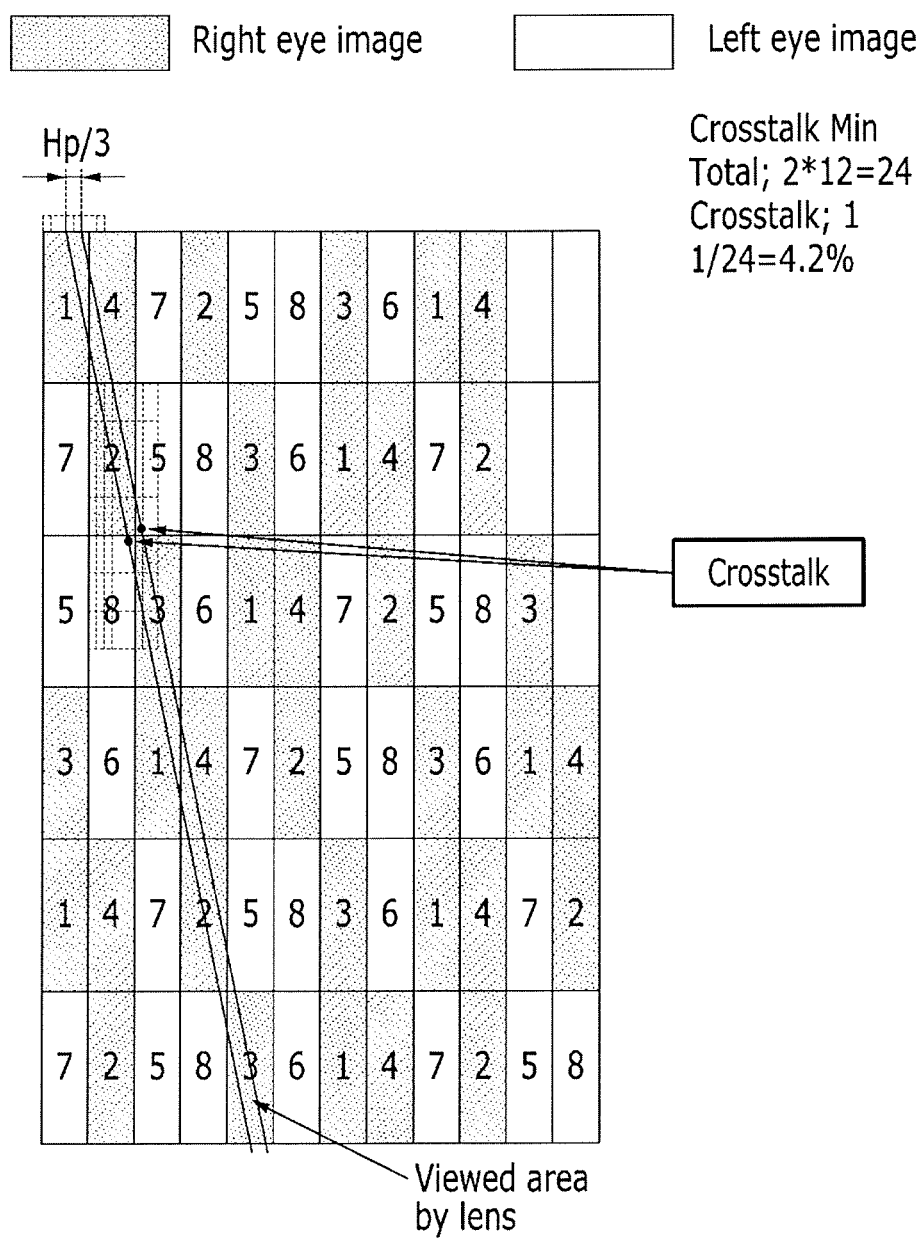
FIG. 23 to FIG. 25 illustrate crosstalk that occurs due to head tracking of a stereoscopic image display device according to an exemplary embodiment.
Figure 24:
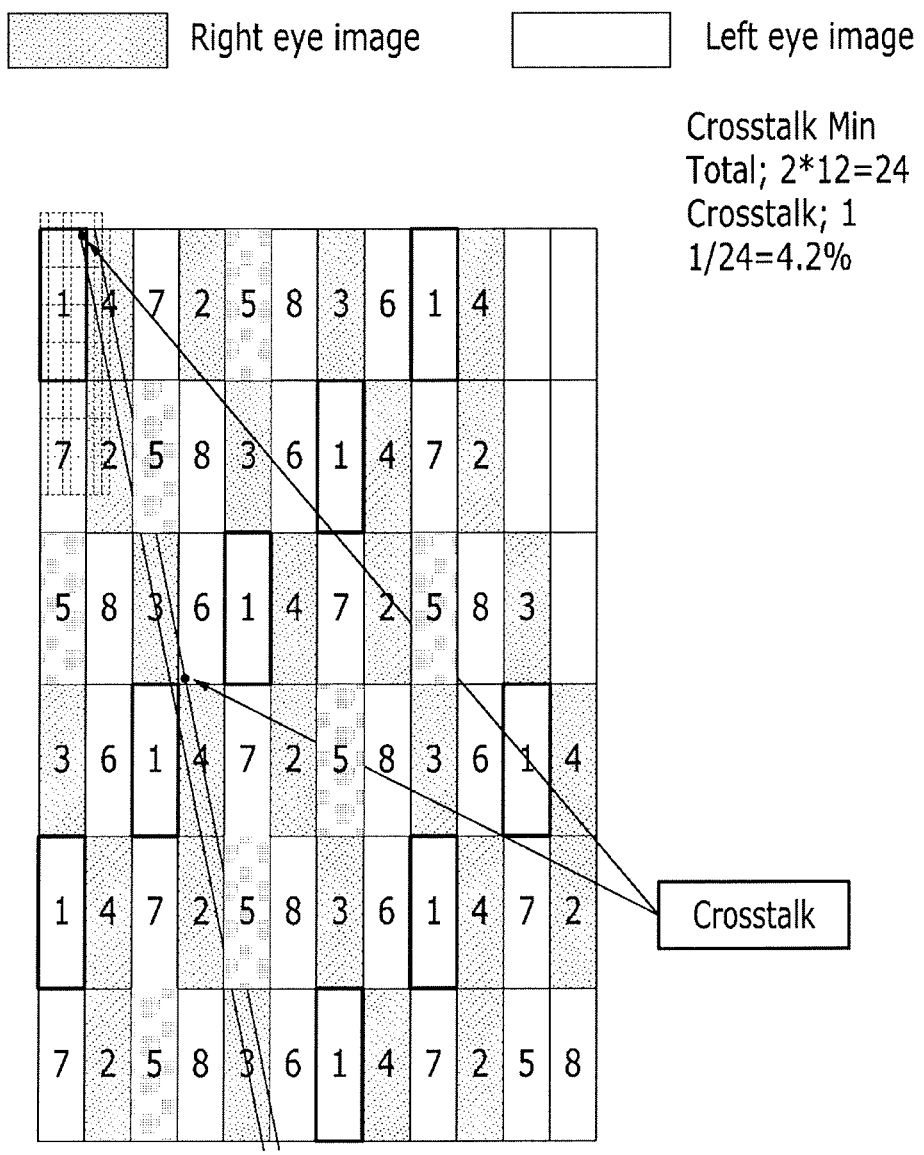
Figure 25:
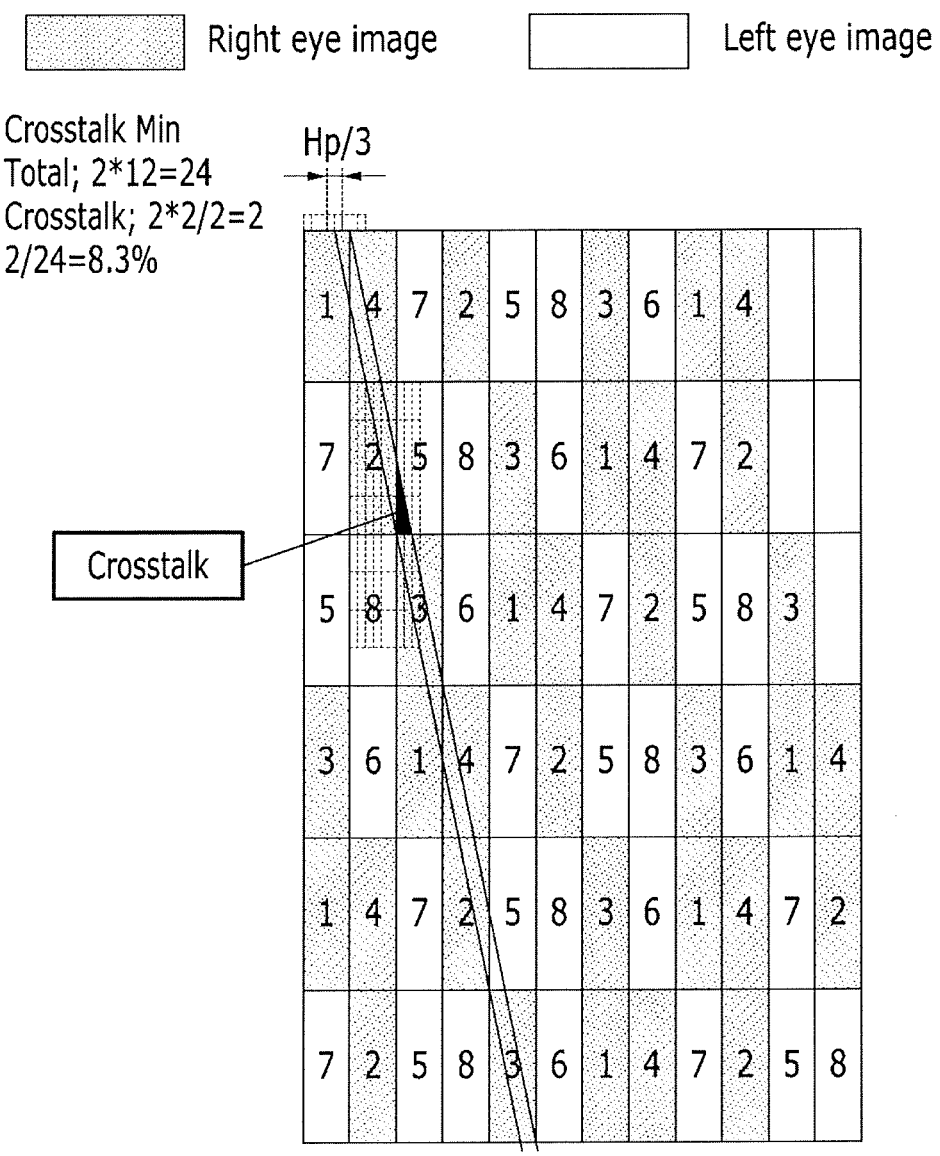

FIG. 23 to FIG. 25 illustrate crosstalk that occurs due to head tracking of a stereoscopic image display device according to an exemplary embodiment. In FIG. 23 to FIG. 25, an inclination angle of the lenticular lens 810 is tan−1 (2Hp/3Vp), m=3, b=2, and the number of pixels that form a proximate pixel set PD is 4. In addition, to prevent occurrence of a moiré phenomenon, an area having a width of Hp/3 is defocused in areas of pixels PX in the lenticular lens 810. An area having a width Hp/3 along the inclination angle is an area viewed through the lens in three rows, which may be 24 areas when one dot is divided into 24 areas.

Referring to FIG. 23, crosstalk may occur in one area in the three rows. Then, a crosstalk occurrence ratio is 1/24, which corresponds to 4.2% of the total.

Referring to FIG. 24, when an image displayed in pixels changes due to head tracking, crosstalk may occur in one area every three rows. Then, a crosstalk occurrence ratio is 1/24, which corresponds to 4.2% of the total.

FIG. 25 illustrates a case where a maximum crosstalk occurs, and crosstalk may occur in two areas within four rows. Then, a crosstalk occurrence ratio is 2/24, which corresponds to 8.3% of total. As shown in FIG. 23 to FIG. 25, a stereoscopic image display device according to an exemplary embodiment can suppress crosstalk occurrence because the crosstalk occurs with a ratio of 4.2% to 8.3%.

Figure 26:
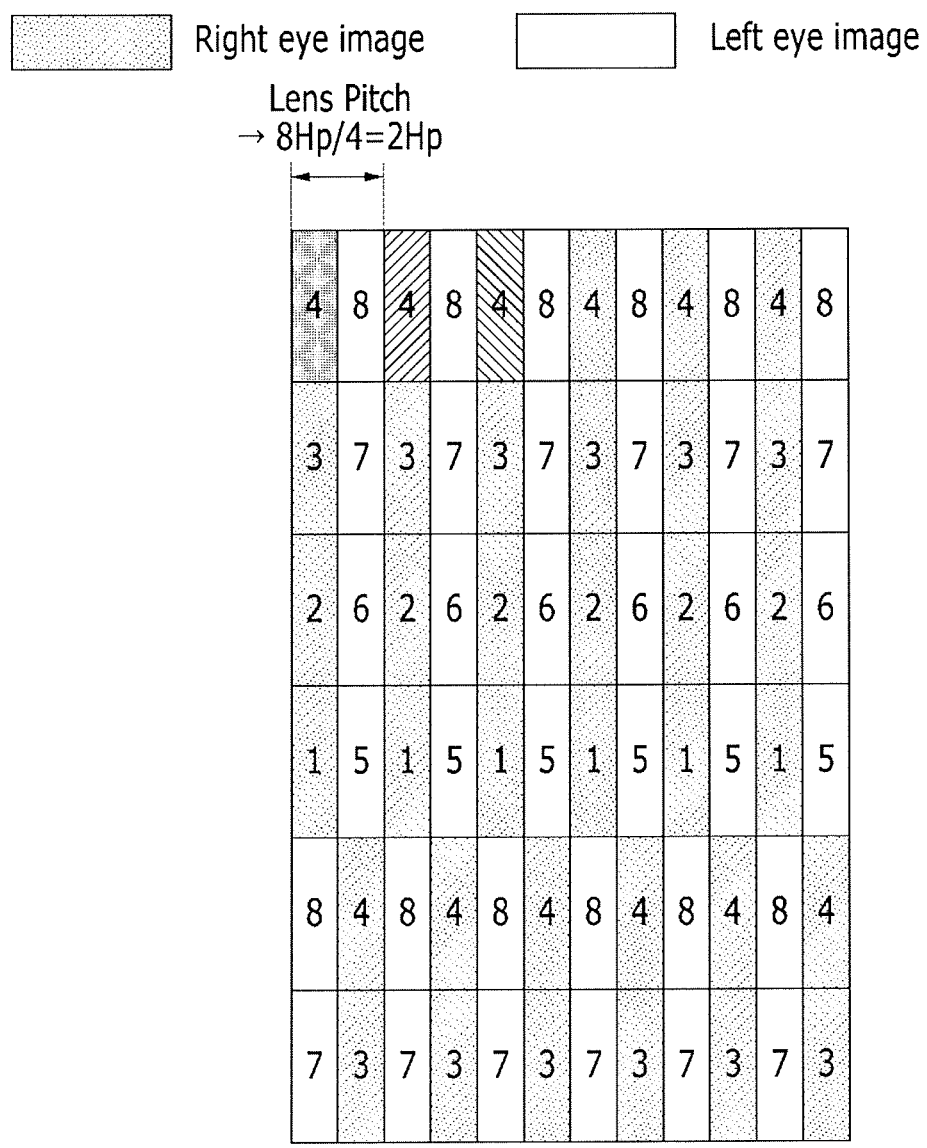
FIG. 26 and FIG. 27 illustrate head tracking as performed by a stereoscopic image display device according to an exemplary embodiment.
Figure 27:
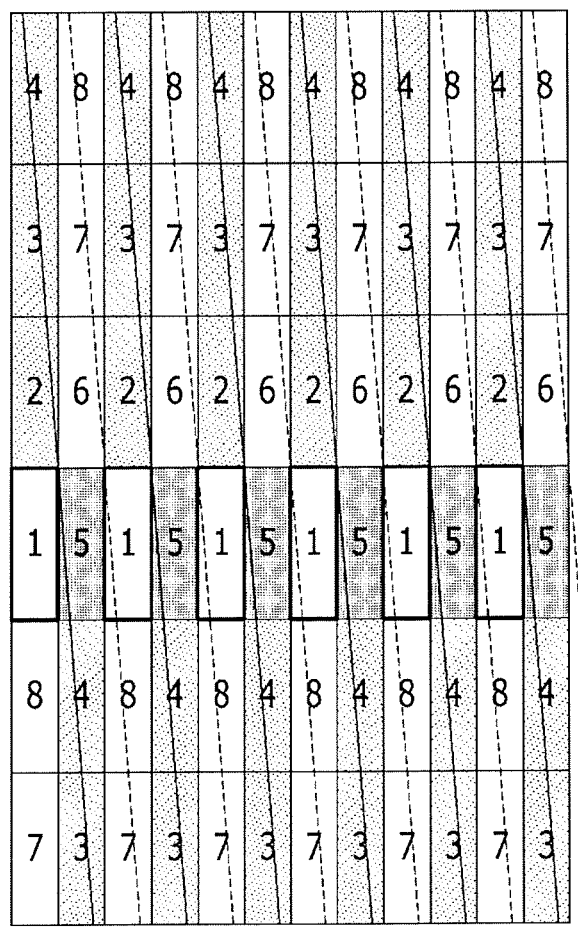

Next, a stereoscopic image display device according to another embodiment that can display a first viewpoint image and a second viewpoint image with respect to neighboring proximate pixel sets PD when an inclination angle of the lenticular lens 810 and the number of pixels that form a proximate pixel set PD are predetermined will be described with reference to FIG. 26 and FIG. 27. FIG. 26 and FIG. 27 illustrate head tracking as performed by a stereoscopic image display device according to an exemplary embodiment. In FIG. 26 and FIG. 27, an inclination angle of the lenticular lens 810 as calculated by Equation 1 is tan−1(1Hp/4Vp), and the number of pixels that form a proximate pixel set PD as calculated by Equation 2 is 4. In addition, a pitch of the lenticular lens 810 as calculated by Equation 3 is 2 dots.

Referring to FIG. 26, an R image may be displayed in a proximate pixel set PD that includes first to fourth pixels 1 to 4 and an L image may be displayed in a proximate pixel set PD that includes fifth to eighth pixels 5 to 8. Then, the R image is transmitted through the lenticular lens 810 and viewed at a first viewing position at the optimal viewing distance OVD, and the L image is transmitted through the lenticular lens 810 and viewed at a second viewing position at the optimal viewing distance OVD. In this case, the first viewing position and the second viewing position may correspond to locations of both eyes of the viewer at the optimal viewing distance OVD. When the R image and the L image are respectively transmitted through the lenticular lens 810 and thus reach both viewer's eyes, the viewer perceives the R image and the L image together as a 3D image having depth. However, when a location of the viewer's head of the viewer or the locations of both viewer's eyes change at the optimal viewing distance OVD, a location of an image transmitted through the lenticular lens 810 and a location of the viewer no longer correspond to each other so that an L image may be viewed by the right eye or an R image may be viewed by the left eye of the viewer, thereby causing crosstalk. When crosstalk occurs, a viewer cannot perceive a normal 3D image.

In FIG. 27, the inclination angle line has moved to the right side compared to the inclination angle line of FIG. 26 due to a changed head location of the viewer or the changed eye locations of the viewer. In the changed viewing position at the optimal viewing distance OVD, an image displayed in pixels that correspond to the shifted inclination angle line is viewed. The sensor may detect the changed head location of the viewer or the changed eye locations of the viewer. The controller 400 changes an image displayed in the pixels PX of a proximate pixel set PD based on the detected location. In detail, the controller 400 displays the R image in a proximate pixel set PD that includes second to fifth pixels 2 to 5 and the L image in a proximate pixel set PD that includes first and sixth to eight pixels 1 and 6 to 8.

Figure 28:
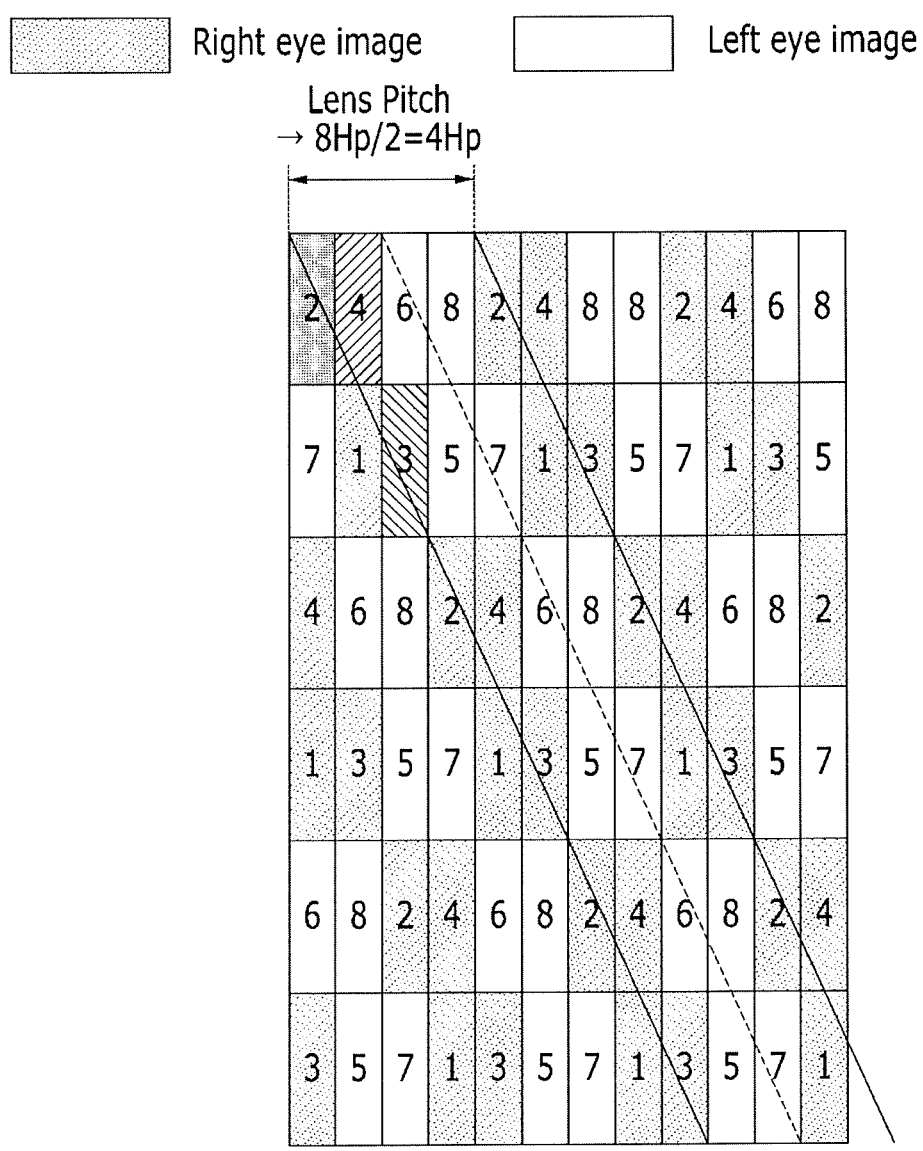
FIG. 28 and FIG. 29 illustrate head tracking as performed by a stereoscopic image display device according to another exemplary embodiment.
Figure 29:
Figure 29:
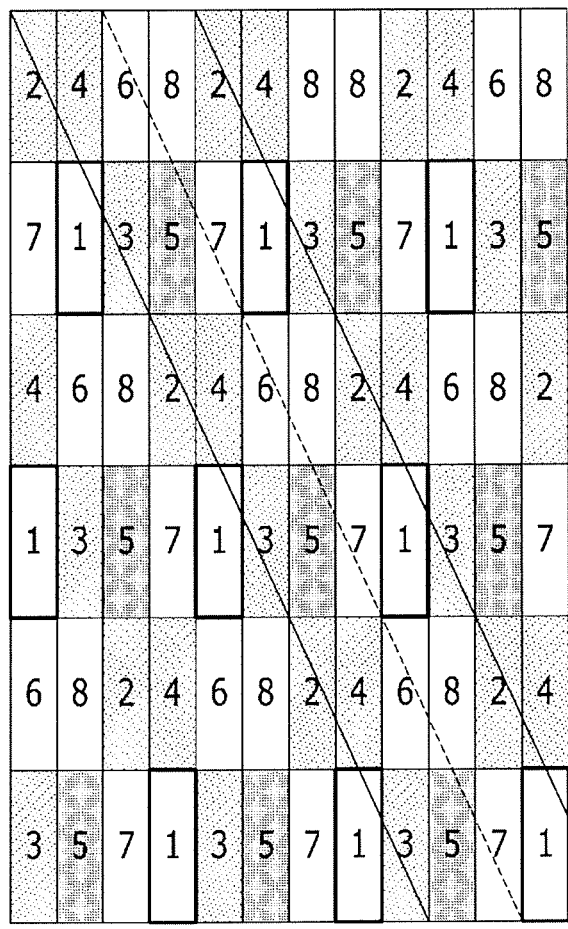
Figure 29:
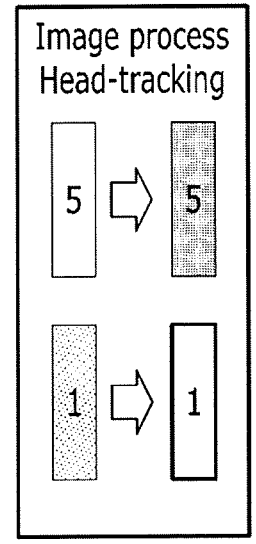

Next, a stereoscopic image display device according to another embodiment that can display a first viewpoint image and a second viewpoint image with respect to neighboring proximate pixel sets PD when an inclination angle of the lenticular lens 810 and the number of pixels forming a proximate pixel set PD are predetermined will be described with reference to FIG. 28 and FIG. 29. FIG. 28 and FIG. 29 illustrate head tracking as performed by a stereoscopic image display device according to another exemplary embodiment. In FIG. 28 and FIG. 29, an inclination angle of the lenticular lens 810 as calculated by Equation 1 is tan−1(2Hp/3Vp), and the number of pixels that form a proximate pixel set PD as calculated by Equation 2 is 4. In addition, a pitch of the lenticular lens 810 as calculated by Equation 3 is 4 dots.

Referring to FIG. 28, an R image may be displayed in a proximate pixel set PD that includes first to fourth pixels 1 to 4 and an L image may be displayed in a proximate pixel set PD that includes fifth to eighth pixels 5 to 8. Then, the R image is transmitted through the lenticular lens 810 and viewed at a first viewing position at the optimal viewing distance OVD, and the L image is transmitted through the lenticular lens 810 and viewed at a second viewing position at the optimal viewing distance OVD. In this case, the first viewing position and the second viewing position may correspond to locations of both viewer's eyes at the optimal viewing distance OVD. When the R image and the L image are respectively transmitted through the lenticular lens 810 and reach both viewer's eyes, the viewer perceives the R image and the L image together as a 3D image having depth. However, when a location of the viewer's head or the locations of the viewer's eyes changes at the optimal viewing distance OVD, a location of an image transmitted through the lenticular lens 810 and a location of the viewer no longer correspond to each other so that an L image may be viewed by the viewer's right eye or an R image may be viewed by the viewer's left eye, thereby causing crosstalk. When crosstalk occurs, a viewer cannot perceive a normal 3D image.

In FIG. 29, the inclination angle line has moved to the right side compared to the inclination angle line of FIG. 28 due to a changed head location of the viewer or the changed eye locations of the viewer. In the changed viewing position at the optimal viewing distance OVD, an image displayed in pixels that correspond to the shifted inclination angle line is viewed. The sensor may detect the changed head location of the viewer or the changed eye locations of the viewer. The controller 400 changes an image displayed in the pixels PX included in a proximate pixel set PD due to the detected location. In detail, the controller 400 displays the R image in a proximate pixel set PD that includes second to fifth pixels 2 to 5 and the L image in a proximate pixel set PD that includes first and sixth to eight pixels 1 and 6 to 8.

Embodiments of the present disclosure can be implemented as a computer-readable code in a non-transitory computer-readable recording medium. The computer-readable recording medium includes all types of non-transitory recording apparatuses in which data that can be read by a computer system is stored. Examples of a non-transitory computer-readable recording media include a ROM, a RAM, a CD-ROM, a magnetic tape, a floppy disk, an optical data storage unit, a non-memory semiconductor, etc. In addition, the computer may include a controller for a terminal.

Therefore, it should be considered that the above description is non limiting, but illustrative in all aspects. The scope of the disclosure is defined by the appended claims, and therefore all changes and modifications that fall within metes and bounds of the claims, or equivalents of such metes and bounds, are therefore intended to be embraced by the claims. It will be apparent to those skilled in the art that various modifications and changes may be made without departing from the scope and spirit of the disclosure as defined by the appended claims.

What is claimed is:

1. A stereoscopic image display device comprising: a viewpoint division unit that divides an image displayed by a plurality of pixels into images corresponding to k viewpoints, wherein the viewpoint division unit comprises a plurality of viewpoint division units inclined with an inclination angle with respect to a pixel column that satisfies:

$$VA = \tan^{-1}\frac{b \times Hp}{m \times Vp}$$

wherein Hp denotes a pitch of a row direction of the pixels, Vp denotes a pitch of a column direction of the pixels, and m and b are natural numbers, and a number of first pixels arranged in an m×b unit area that transmits a same viewpoint division unit is n=b+m−1;

wherein the viewpoint division unit comprises a lenticular lens; and a display panel that includes the plurality of pixels arranged in a matrix format, wherein when a viewer views an image of the display panel at an optimal viewing distance from the viewpoint division unit, the following equation is satisfied:

$$\left(\frac{n}{m}\times Hp\right):g = E:d,$$
$$d:Lp = (d+g):\left(2\times\frac{n}{m}\times Hp\right)$$

wherein E denotes a distance between both eyes of the viewer, g denotes a distance between the viewpoint division unit and the display panel, Lp denotes a pitch of the lenticular lens, and d denotes the optimal viewing distance.

2. The stereoscopic image display device of claim 1, wherein a width of a row direction of the first pixel area viewed through the lenticular lens is Hp/m.

3. The stereoscopic image display device of claim 1, wherein a pitch of the lenticular lens corresponds to 2n/m pixels.

4. The stereoscopic image display device of claim 1, further comprising: a sensor configured to detect locations of a viewer's eyes; and a controller configured to change pixels when an image corresponding to the k viewpoints corresponds to locations of both eyes.

5. The stereoscopic image display device of claim 4, wherein the controller changes pixels of the image corresponding to the k viewpoints by setting a viewing area having a width of E/n as a control unit at the optimal viewing distance.

6. The stereoscopic image display device of claim 4, wherein, when the sensor detects the locations of both viewer's eyes to change to a second location from a first location while the k viewpoints display a binocular image, wherein a distance between the first location and the second location exceeds E/n, the controller changes at least one pixel of pixels displaying a left-eye image to display a right-eye image and changes at least one pixel of pixels displaying the right-eye image to display the left-eye image.

7. The stereoscopic image display device of claim 1, wherein b=3 and m=4.

8. The stereoscopic image display device of claim 1, wherein pixels in one pixel column represent a same primary color.

9. The stereoscopic image display device of claim 8, wherein pixels of adjacent pixel columns represent different primary colors.

* * * * *